(12) United States Patent
Russell

(10) Patent No.: US 12,276,741 B1
(45) Date of Patent: Apr. 15, 2025

(54) DIRECTION OF ARRIVAL ESTIMATION

(71) Applicant: Amazon Technologies, Inc., Seattle, WA (US)

(72) Inventor: Spencer Russell, Quincy, MA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 17/879,634

(22) Filed: Aug. 2, 2022

(51) Int. Cl.
*H04R 3/00* (2006.01)
*G01S 3/80* (2006.01)
*G01S 3/801* (2006.01)

(52) U.S. Cl.
CPC ............ *G01S 3/8006* (2013.01); *G01S 3/801* (2013.01)

(58) Field of Classification Search
CPC ................................ G01S 3/8006; G01S 3/801
USPC ....................................................... 381/74, 92
See application file for complete search history.

(56) References Cited

U.S. PATENT DOCUMENTS

| | | | | |
|---|---|---|---|---|
| 10,598,543 B1 * | 3/2020 | Mansour | ................. | H04R 1/326 |
| 11,107,492 B1 * | 8/2021 | Chu | ........................ | H04R 3/005 |
| 11,467,244 B2 * | 10/2022 | Chen | ...................... | G01S 3/8006 |
| 11,567,162 B2 * | 1/2023 | Chen | ...................... | G01S 3/8006 |
| 2013/0272538 A1 * | 10/2013 | Kim | ......................... | H04R 1/08 381/92 |
| 2016/0360314 A1 * | 12/2016 | Iyengar | ................... | H04R 3/005 |
| 2021/0140947 A1 * | 5/2021 | Knipp | ................ | G01N 33/5058 |
| 2022/0120839 A1 * | 4/2022 | Mars | ..................... | G01S 3/8027 |

* cited by examiner

*Primary Examiner* — William J Deane, Jr.
(74) *Attorney, Agent, or Firm* — Pierce Atwood LLP

(57) ABSTRACT

A system configured to determine an estimated angle of arrival in reverberant environments. When a first device detects a calibration tone generated by a second device, the first device may generate multichannel audio representing the calibration tone and process the multichannel audio using a combination of detection filtering and subspace processing to determine a relative direction of the second device. For example, the first device may perform matched filtering to isolate a direct-path peak for the calibration tone, and then may sweep through all potential azimuth directions to identify an azimuth value corresponding to the direct-path peak. In some examples, the first device identifies a steering vector associated with a particular direction (e.g., signal subspace) that minimizes components in all other directions (e.g., noise subspace). The device may determine this steering vector independently for each frequency band and calculate the estimated angle of arrival by averaging results across frequency bands.

20 Claims, 20 Drawing Sheets

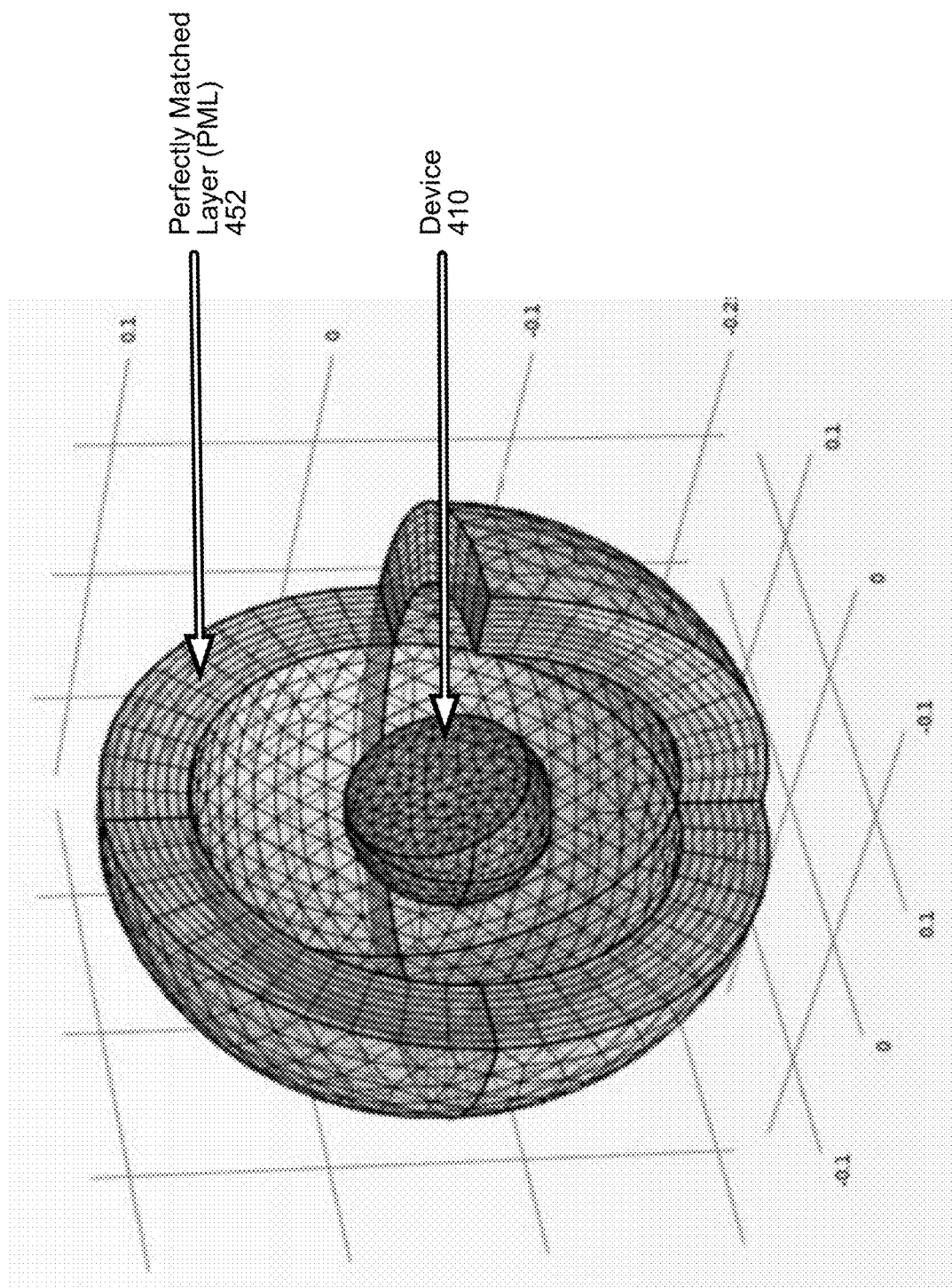

Raw Device Capture
810

Raw Cross-Correlation
820

Rolling-Norm Cross-Correlation
830

First Peak Detection
840

FIG. 10

Subspace Processing
Equations
1000

Signal Model 1010    $\mathbf{X}(\omega) = F(\omega)\mathbf{A}_\theta(\omega)$

Incident Signal 1015    $F(\omega)$

Steering Vector 1020    $\mathbf{A}_\theta(\omega)$

Normalized Basis Vector 1030    $\mathbf{Z}(\omega) = \frac{\mathbf{X}(\omega)}{|\mathbf{X}(\omega)|}$ Signal Projection 1040    $\mathbf{Z}(\omega)\overline{\mathbf{Z}(\omega)}\mathbf{A}_\theta(\omega)$ Elevation Examples 1200

← Individual Elevation 1230

← Grouped Elevation 1220

← Elevation Agnostic 1210

DIRECTION OF ARRIVAL ESTIMATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIGS. 4A-4C illustrate a device having a microphone array and examples of determining a device response via simulation or measurement according to embodiments of the present disclosure.

FIG. 10 illustrates examples of equations used for subspace processing according to embodiments of the present disclosure.

DETAILED DESCRIPTION

Electronic devices may be used to capture input audio and process input audio data. The input audio data may be used for voice commands and/or sent to a remote device as part of a communication session. In addition, the electronic devices may be used to process output audio data and generate output audio. The output audio may correspond to the communication session or may be associated with media content, such as audio corresponding to music or movies played in a home theater. Multiple devices may be grouped together in order to generate output audio using a combination of the multiple devices.

To determine a relative direction associated with another device, devices, systems and methods are disclosed that perform direction of arrival estimation. For example, a device may process multichannel audio using a combination of detection filtering (e.g., matched filtering, inverse filtering, etc.) and subspace processing to determine an azimuth value indicating an estimated angle of arrival. In some examples, the device may perform detection filtering to isolate a direct-path peak for an individual calibration tone, and then may use subspace processing to sweep through all potential azimuth directions and identify the estimated azimuth value corresponding to the direct-path peak. As part of subspace processing, the device identifies a steering vector associated with a particular direction (e.g., signal subspace) that minimizes components in all other directions (e.g., noise subspace). The device may determine this steering vector independently for each frequency band and/or elevation and may calculate the estimated azimuth value by averaging results across frequency bands and/or elevations.

Figure 1:
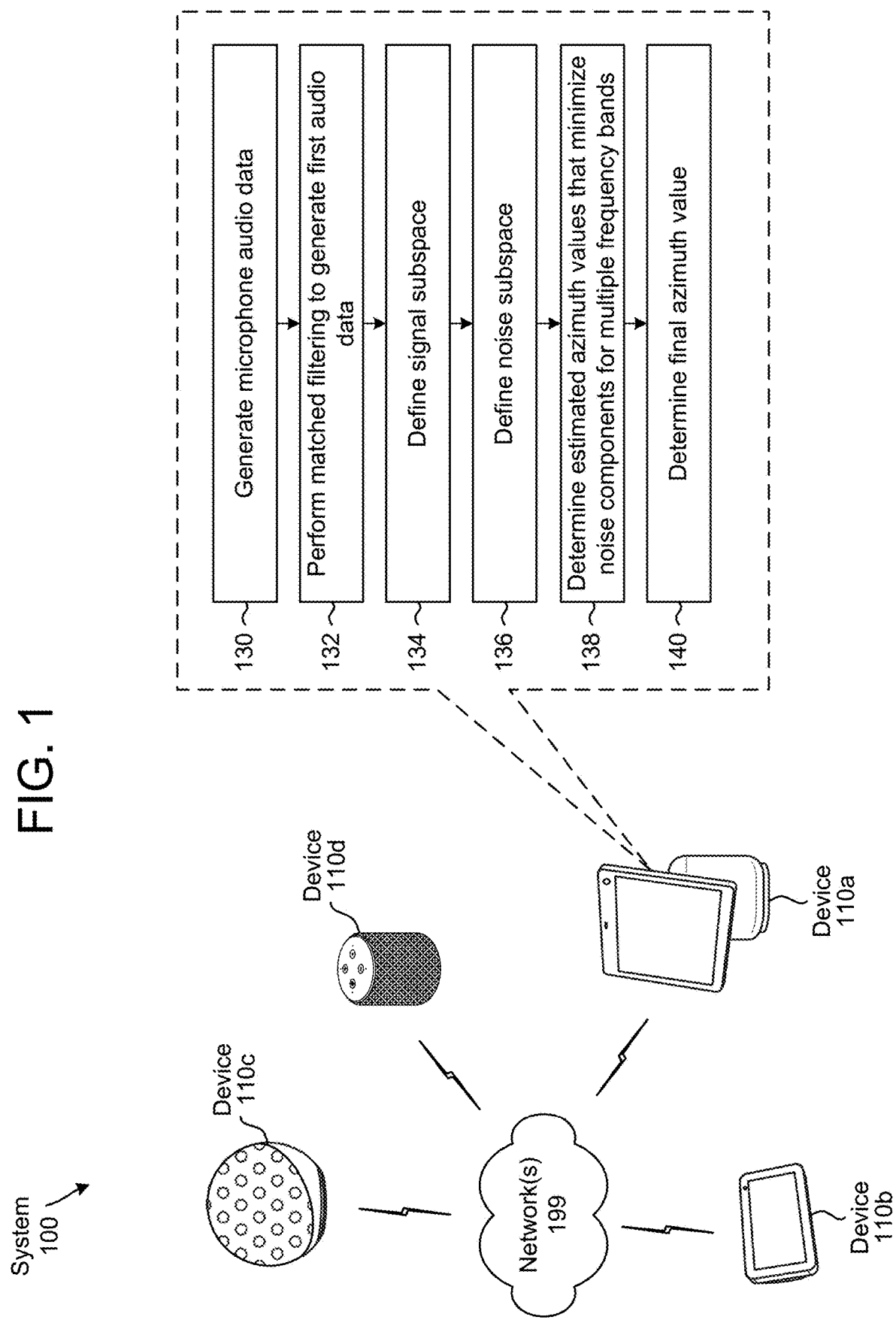
FIG. 1 is a conceptual diagram illustrating a system configured to perform direction of arrival estimation according to embodiments of the present disclosure.

FIG. 1 is a conceptual diagram illustrating a system configured to perform direction of arrival estimation according to embodiments of the present disclosure. As illustrated in FIG. 1, a system 100 may include multiple devices 110a/110b/110c/110d connected across one or more networks 199. In some examples, the devices 110 may also be connected to one or more supporting device(s) 120 across the one or more networks 199, although the disclosure is not limited thereto.

The device 110 may be an electronic device configured to capture and/or receive audio data. For example, the device 110 may include a microphone array that is configured to generate input audio data using two or more microphones 112, although the disclosure is not limited thereto and the device 110 may include multiple individual microphones 112 without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive output audio data and generate output audio using one or more loudspeakers of the device 110. For example, the device 110 may generate output audio corresponding to media content, such as music, a movie, and/or the like.

As illustrated in FIG. 1, the system 100 may include four separate devices 110a-110d, which may be included in a flexible home theater group, although the disclosure is not limited thereto and any number of devices may be included in the flexible home theater group without departing from the disclosure. In some examples, a user may group the four devices 110a-110d as part of the flexible home theater group and the system 100 may synchronize output audio between the four devices 110a-110d. For example, the system 100 may select one of the four devices 110a-110d as a primary device that is configured to synchronize a timing of the four devices 110a-110d, perform device mapping, generate rendering coefficient data, and/or the like. If the system 100 selects one of the devices as a primary device, the primary device may be configured to send commands and other notifications to the remaining devices, which may be referred to as secondary devices. For ease of illustration, steps performed by the primary device may be described with regard to the system 100, even though these steps may be performed by one of the devices 110 without departing from the disclosure.

In some examples, the system 100 may receive a home theater configuration. For example, the user may use a smartphone or other devices and may input the home theater configuration using a user interface. However, the disclosure is not limited thereto, and the system 100 may receive the home theater configuration using other techniques and/or inputs without departing from the disclosure. In response to the home theater configuration, the system 100 may form the flexible home theater group, may generate configuration data indicating a sequence for generating playback audio, may send the configuration data to each device 110 in the flexible home theater group, and may cause the devices 110 to perform the calibration sequence. For example, the configuration data may indicate that the first device 110a may generate a first audible sound during a first time range, the second device 110b may generate a second audible sound during a second time range, the third device 110c may generate a third audible sound during a third time range, and that the fourth device 110d may generate a fourth audible sound during a fourth time range. In some examples there are gaps between the audible sounds, such that the configuration data may include values of zero (e.g., padded with zeroes between audible sounds), but the disclosure is not limited thereto and the configuration data may not include gaps without departing from the disclosure.

For ease of illustration, the disclosure may refer to the devices 110 generating a calibration tone, such as an audible sound, during the calibration sequence. However, the disclosure is not limited thereto, and the calibration tone may be an inaudible sound without departing from the disclosure. Thus, the devices 110 may generate the calibration tone as an ultrasonic sound and/or the like without departing from the disclosure. While the calibration tone itself may vary, the calibration tone may be known to each of the devices 110 included in the flexible home theater group. For example, in some examples the configuration data may indicate the calibration tone and/or the devices 110 may be configured to detect the calibration tone in the audio data. As used herein, the calibration tone may be referred to as an excitation signal, a stimulus signal, a template signal, a known signal, and/or the like, although the disclosure is not limited thereto. In some examples, the devices 110 may be configured to detect the calibration tone using calibration data that includes a representation of the calibration tone. For example, the devices 110 may convolve microphone audio data with the calibration data to detect the calibration tone represented in the microphone audio data without departing from the disclosure.

During the calibration sequence, a single device 110 may generate an audible sound and the remaining devices may capture the audible sound in order to determine a relative direction and/or distance associated with the output device. For example, when the first device 110a generates the first audible sound, the second device 110b may capture the first audible sound by generating first audio data including a first representation of the first audible sound. Thus, the second device 110b may perform localization (e.g., sound source localization (SSL) processing and/or the like) using the first audio data and determine a first position of the first device 110a relative to the second device 110b. Similarly, the third device 110c may generate second audio data including a second representation of the first audible sound. Thus, the third device 110c may perform localization using the second audio data and may determine a second position of the first device 110a relative to the third device 110c. Each of the devices 110 may perform these steps to generate audio data and/or determine a relative position of the first device 110a relative to the other devices 110.

In some examples, the first device 110a may generate third audio data that includes a third representation of the first audible sound. For example, the first device 110a may generate the third audio data during the entire calibration sequence, including when the first device 110a is generating the first audible sound. While the first device 110a does not need to use the third audio data to determine a position of the first device 110a, the third representation of the first audible sound may enable the first device 110a to perform additional processing to synchronize the first device 110a with the remaining devices 110b-110d.

After the first device 110a generates the first audible sound, the second device 110b may generate a second audible sound and each of the devices 110a-110d may perform the steps described above to generate audio data that includes a representation of the second audible sound and/or determining a relative position of the second device 110b. Thus, the calibration sequence may continue this process for each of the output devices included in the flexible home theater group, such that every device 110 in the flexible home theater group may generate audio data capturing the calibration tones output by the output devices 110 included in the flexible home theater group. However, devices 110 that are not associated with one or more microphone(s) 112 may not be configured to generate the audio data without departing from the disclosure. Additionally or alternatively, some of the devices 110 included in the flexible home theater group may not be associated with one or more loudspeakers and therefore may be unable to generate the calibration tone without departing from the disclosure.

Using the audio data generated during the calibration sequence, the first device 110a may determine relative positions and/or relative directions of each of the other devices 110b-110d. For example, the first device 110a may determine a first position of the second device 110b relative to the first device 110a, a second position of the third device 110c relative to the first device 110a, and/or a third position of the fourth device 110d relative to the first device 110a. As used herein, determining a relative position of the second device 110b may correspond to determining a direction of the second device 110b relative to an orientation of the first device 110a and/or a distance from the first device 110a to the second device 110b.

In some examples, the first device 110a may determine the relative direction of the second device 110b by determining a direction of arrival associated with the second audible sound. As used herein, the direction of arrival may correspond to an azimuth component (e.g., angle indicating a direction along a horizontal plane) and/or an elevation component (e.g., angle indicating a direction along a vertical plane) without departing from the disclosure. For ease of illustration, the direction of arrival may be described with reference only to the azimuth component, which may be referred to as an azimuth value, an Angle of Arrival (AoA) value, an estimated AoA, and/or the like without departing from the disclosure. Thus, whether the first device 110a determines the elevation component or not, the elevation is not used for device localization and the direction of arrival may be represented using only the azimuth component. For example, the first device 110a may determine a first azimuth value that indicates the estimated AoA of the second audible sound with respect to an orientation of the first device 110a. However, the disclosure is not limited thereto, and in other examples the direction of arrival may be described with reference to both the azimuth component and the elevation component without departing from the disclosure. For example, the first device 110a may determine that the direction of arrival associated with the second device 110b corresponds to the first azimuth value and a first elevation value, although the disclosure is not limited thereto.

While the example described above refers to the first device 110a determining the direction of arrival for other devices 110 included in the flexible home theater group, the disclosure is not limited thereto. In some examples, a first device 110a may determine the direction of arrival for a second device 110b regardless of a configuration, location, relative placement, and/or the like associated with the second device 110b. Additionally or alternatively, while the example described above refers to the first device 110a generating audio data as part of a calibration sequence, the disclosure is not limited thereto. For example, the first device 110a may generate audio data and determine the direction of arrival for the second device 110b without participating in a calibration sequence and/or without the first device 110a generating the calibration tone without departing from the disclosure. Thus, the first device 110a may determine the direction of arrival for any device 110 in proximity to the first device 110a, without either device 110 being part of the flexible home theater group, without departing from the disclosure.

As will be described in greater detail below, the system 100 may perform direction of arrival estimation using a combination of detection filtering (e.g., matched filtering, inverse filtering, etc.) and subspace processing to determine a direction of arrival associated with a device. In some examples, the system 100 may perform detection filtering to isolate a direct-path peak for an individual calibration tone. The temporal isolation enabled by the detection filter enables the system 100 to perform subspace processing to accurately determine the direction of arrival. As part of the subspace processing, the system 100 may sweep through all potential azimuth directions and identify the estimated azimuth value corresponding to the direct-path peak. For example, the system 100 may identify a steering vector associated with a particular direction (e.g., signal subspace) that minimizes components in all other directions (e.g., noise subspace). The system 100 may determine this steering vector independently for each frequency band and/or elevation and may calculate the estimated azimuth value by averaging results across frequency bands and/or elevations, although the disclosure is not limited thereto.

To determine the azimuth value, the first device 110a may generate (130) microphone audio data that includes a representation of the second audible sound and may isolate a portion of the microphone audio data that includes the representation of the second audible sound. In some examples, the first device 110a may perform (132) matched filtering to generate first audio data. For example, the first device 110a may perform matched filtering using calibration data to detect a calibration tone corresponding to the second audible sound and identify a first peak (e.g., direct-path peak) associated with the second audible sound, as will be described in greater detail below with regard to FIGS. 6-8B. However, the disclosure is not limited thereto, and the first device 110a may perform detection filtering using other techniques, such as inverse filtering, without departing from the disclosure. Additionally or alternatively, while the example described above refers to detecting a calibration tone, the disclosure is not limited thereto and the first device 110a may perform detection filtering to detect any known stimulus (e.g., excitation signal) without departing from the disclosure.

After identifying the first peak, the first device 110a may isolate the portion of the microphone audio data by applying a window around the first peak and may then generate the first audio data by converting the portion of the microphone audio data from a time-domain to a frequency-domain. For example, the first device 110a may perform Discrete Fourier Transforms (DFTs) (e.g., Fast Fourier transforms (FFTs), short-time Fourier Transforms (STFTs), and/or the like) to generate the first audio data in the frequency-domain, as described in greater detail below.

Using the first audio data, the first device 110a may perform subspace processing to determine an estimated angle of arrival associated with the second audible sound. For example, the first device 110a may define (134) a signal subspace, define (136) a noise subspace, and determine (138) estimated azimuth values that minimize noise components in the noise subspace for multiple frequency bands. Thus, the first device 110 may define the signal subspace and the noise subspace and then perform parameterization to determine the estimated azimuth values. For example, the first device 110a may sweep through a plurality of potential azimuth values (e.g., sweep through the parameter space, where the parameter is the azimuth θ) to find an estimated azimuth value corresponding to a steering vector that minimizes the noise components projected in the noise subspace, as will be described in greater detail below.

The first device 110a may sweep through the plurality of potential azimuth values using steering vectors and/or vector data included in a device dictionary associated with the first device 110a. As used herein, the device dictionary may be referred to as device acoustic characteristics data and may include vector data that corresponds to one or more steering vectors, acoustic pressure vectors, dictionary vectors, and/or the like, although the disclosure is not limited thereto. For example, the device acoustic characteristics data represents the acoustic response of the first device 110a to each acoustic plane-wave of interest, completely characterizing the device behavior for each acoustic plane-wave. Thus, the system 100 may use the device acoustic characteristics data to accommodate for the acoustic wave scattering due to the device surface (e.g., surface of the first device 110a). Each entry of the device acoustic characteristics data has the form $\{z(\omega,\phi,\theta)\}_{\omega,\phi,\theta}$, which represents the acoustic pressure vector (at all microphones) at frequency $\omega$, for an acoustic plane-wave of elevation $\phi_1$ and azimuth $\theta_1$. Thus, a length of each entry of the device acoustic characteristics data corresponds to a number of microphones 112 included in the microphone array.

As described in greater detail below with regard to FIGS. 4A-4C, the system 100 may calculate the device acoustic characteristics data (e.g., device dictionary) once for a given device (e.g., first device 110a) and/or type of device (e.g., multiple devices 110) without departing from the disclosure. For example, the first device 110a may store first device acoustic characteristics data that was calculated specifically for the first device 110a and may retrieve vector data (e.g., steering vector(s), acoustic pressure vector(s), etc.) associated with the first device acoustic characteristics data whenever the first device 110a determines estimated azimuth values. Similarly, the second device 110b may store second device acoustic characteristics data that was calculated specifically for the second device 110b and may use the second device acoustic characteristics data to determine estimated azimuth values indicating a relative direction (e.g., angle of arrival) of the first device 110a and/or other devices 110.

While the example described above refers to the first device 110a using steering vectors and/or vector data included in a device dictionary associated with the first device 110a, the disclosure is not limited thereto. Thus, the first device 110a may determine steering vectors using other techniques without departing from the disclosure, such as using simulations based on a geometry of the device. For example, the first device 110a may use a freefield model (e.g., microphones floating in space) to estimate a plurality of steering vectors that can be used during subspace processing without departing from the disclosure.

In some examples, the first device 110a may perform subspace processing independently for each frequency band of interest to determine an estimated azimuth value corresponding to the frequency band. Thus, the first device 110a may determine a first estimated azimuth value using a first frequency band, a second estimated azimuth value using a second frequency band, and so on for each frequency band of interest. Using the estimated azimuth values, the first device 110a may determine (140) a final azimuth value. For example, the first device 110a may determine the final azimuth value by averaging the estimated azimuth values without departing from the disclosure. However, the disclosure is not limited thereto and the first device 110a may determine the final azimuth value using a weighted sum and/or other techniques without departing from the disclosure.

While FIG. 1 illustrates an example in which the first device 110a determines the estimated azimuth values corresponding to a plurality of frequency bands in step 138 and then determines the final azimuth value using the estimated azimuth values in step 140, the disclosure is not limited thereto. In some examples, the first device 110a may perform a single step to determine the final azimuth value without departing from the disclosure. For example, the first device 110a may sweep through a plurality of potential azimuth values for multiple frequency bands to determine a final azimuth value in a single step. To illustrate an example, the first device 110a may combine values from each of the multiple frequency bands using a weighted sum and/or the like, enabling the first device 110a to determine the final azimuth value corresponding to a steering vector that minimizes the noise components projected in the noise subspace for a combination of multiple frequency bands without departing from the disclosure. Additionally or alternatively, the first device 110a may determine the final azimuth value based on a single frequency band without departing from the disclosure. For example, the system 100 may determine that a single frequency band provides accurate results and the first device 110a may determine the final azimuth value by performing subspace processing using only the selected frequency band, although the disclosure is not limited thereto.

While FIG. 1 illustrates an example in which the first device 110a determines the direction of arrival by determining the estimated azimuth value, the disclosure is not limited thereto. In some examples, the first device 110a may determine the direction of arrival by determining the estimated azimuth value and an estimated elevation value without departing from the disclosure. For example, the first device 110a may determine that the second device 110b corresponds to a first azimuth value and a first elevation value without departing from the disclosure. Additionally or alternatively, the first device 110a may determine that the second device 110b corresponds to a first azimuth value for a first group of elevation values, a second azimuth value for a second group of elevation values, and so on for each group of elevation values, and then may use these azimuth values to determine the final azimuth value.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones configured to capture sound and pass the resulting audio signal created by the sound to a downstream component. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. A particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, although the disclosure is not limited thereto.

In some examples, a time-domain signal may be represented as microphone audio data z(t), which is comprised of a sequence of individual samples of audio data. Thus, z(t) denotes an individual sample that is associated with a time t. While the microphone audio data z(t) is comprised of a plurality of samples, the disclosure is not limited thereto and in other examples the device 110 may group a plurality of samples and process them together. For example, the device 110 may group a number of samples together in a frame to generate microphone audio data z(n). As used herein, a variable z(n) corresponds to the time-domain signal and identifies an individual frame (e.g., fixed number of samples s) associated with a frame index n.

In some examples, the device 110 may convert microphone audio data z(t) from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) as a first time-domain signal associated with a first subband (e.g., first frequency range), a second bandpass filter may output a second portion of the microphone audio data z(t) as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) in the time-domain to microphone audio data z(t, k) in the subband-domain. However, the disclosure is not limited thereto, and the device 110 may convert microphone audio data z(n) in the time-domain to microphone audio data z(n, k) in the subband-domain without departing from the disclosure.

Additionally or alternatively, the device 110 may convert microphone audio data z(n) from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) in the frequency-domain. As used herein, a variable Z(n, k) corresponds to the frequency-domain signal and identifies an individual frame associated with frame index n and tone index k. Thus, the microphone audio data z(t) corresponds to time indexes, whereas the microphone audio data z(n) and the microphone audio data Z(n, k) corresponds to frame indexes.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data z(n), producing the frequency-domain microphone audio data Z(n, k), where the tone index "k" (e.g., frequency index) ranges from 0 to K and "n" is a frame index ranging from 0 to N. The history of the values across iterations is provided by the frame index "n", which ranges from 1 to N and represents a series of samples over time.

In some examples, the system 100 may perform a K-point FFT on a time-domain signal. For example, if a 256-point FFT is performed on a 16 kHz time-domain signal, the output is 256 complex numbers (e.g., complex amplitude data), where each complex number corresponds to a value at a frequency in increments of 16 kHz/256, such that there is 125 Hz between points, with point 0 corresponding to 0 Hz and point 255 corresponding to 16 kHz. Thus, each tone index in the 256-point FFT corresponds to a frequency range (e.g., subband) in the 16 kHz time-domain signal. While the example described above illustrates an example in which the overall frequency range is divided into 256 different frequency ranges (e.g., tone indexes), the disclosure is not limited thereto and the system 100 may divide the overall frequency range into K different frequency ranges (e.g., K indicates an FFT size) without departing from the disclosure.

Additionally or alternatively, while the system 100 may convert to the frequency-domain using a Fast Fourier Transform (FFT), the disclosure is not limited thereto. Instead, the tone index may be generated using Short-Time Fourier Transform (STFT), generalized Discrete Fourier Transform (DFT) and/or other transforms known to one of skill in the art (e.g., discrete cosine transform, non-uniform filter bank, etc.).

Acoustic theory tells us that a point source produces a spherical acoustic wave in an ideal isotropic (uniform) medium such as air. Further, the sound from any radiating surface can be computed as the sum of spherical acoustic wave contributions from each point on the surface, including any relevant reflections. In addition, acoustic wave propagation is the superposition of spherical acoustic waves generated at each point along a wavefront. Thus, all linear acoustic wave propagation can be seen as a superposition of spherical traveling waves.

Figure 2B:
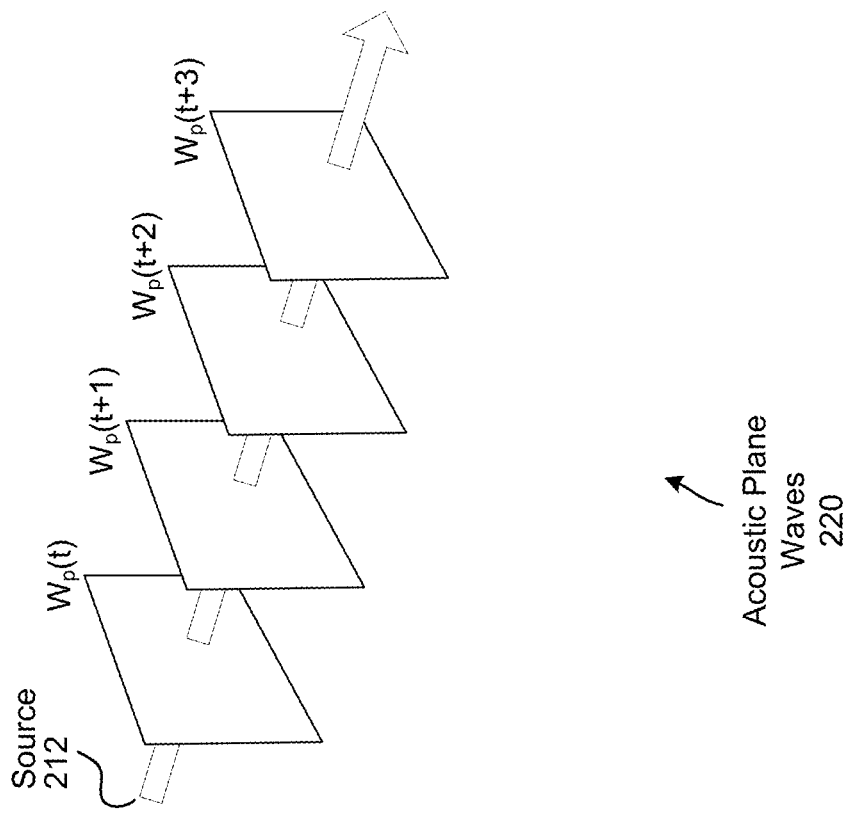
FIGS. 2A-2B illustrate examples of acoustic wave propagation.
Figure 2A:
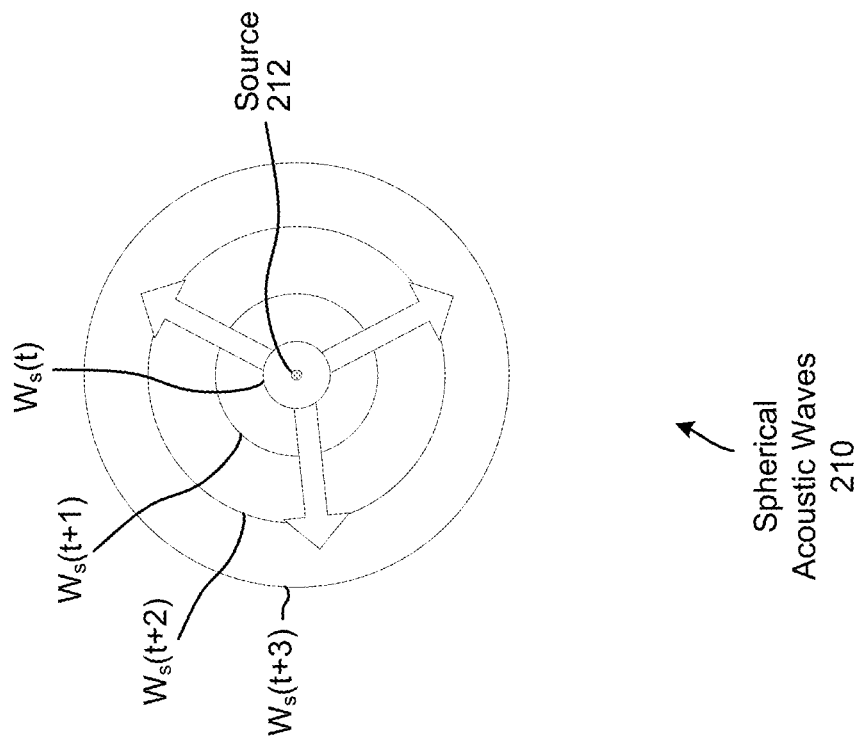

FIGS. 2A-2B illustrate examples of acoustic wave propagation. As illustrated in FIG. 2A, spherical acoustic waves 210 (e.g., spherical traveling waves) correspond to a wave whose wavefronts (e.g., surfaces of constant phase) are spherical (e.g., the energy of the wavefront is spread out over a spherical surface area). Thus, the source 212 (e.g., radiating sound source, such as a loudspeaker) emits spherical traveling waves in all directions, such that the spherical acoustic waves 210 expand over time. This is illustrated in FIG. 2A as a spherical wave $w_s$ with a first arrival having a first radius at a first time $w_s(t)$, a second arrival having a second radius at a second time $w_s(t+1)$, a third arrival having a third radius at a third time $w_s(t+2)$, a fourth arrival having a fourth radius at a fourth time $w_s(t+3)$, and so on.

Additionally or alternatively, acoustic waves can be visualized as rays emanating from the source 212, especially at a distance from the source 212. For example, the acoustic waves between the source 212 and the microphone array can be represented as acoustic plane waves. As illustrated in FIG. 2B, acoustic plane waves 220 (e.g., planewaves) correspond to a wave whose wavefronts (e.g., surfaces of constant phase) are parallel planes. Thus, the acoustic plane waves 220 shift with time/from the source 212 along a direction of propagation (e.g., in a specific direction), represented by the arrow illustrated in FIG. 2B. This is illustrated in FIG. 2B as a plane wave $w_p$ having a first position at a first time $w_p(t)$, a second position at a second time $w_p(t+1)$, a third position at a third time $w_p(t+2)$, a fourth position at a fourth time $w_p(t+3)$, and so on. While not illustrated in FIG. 2B, acoustic plane waves may have a constant value of magnitude and a linear phase, corresponding to a constant acoustic pressure.

Acoustic plane waves are a good approximation of a far-field sound source (e.g., sound source at a relatively large distance from the microphone array), whereas spherical acoustic waves are a better approximation of a near-field sound source (e.g., sound source at a relatively small distance from the microphone array). For ease of explanation, the disclosure may refer to acoustic waves with reference to acoustic plane waves. However, the disclosure is not limited thereto, and the illustrated concepts may apply to spherical acoustic waves without departing from the disclosure. For example, the device acoustic characteristics data may correspond to acoustic plane waves, spherical acoustic waves, and/or a combination thereof without departing from the disclosure.

Figure 3:
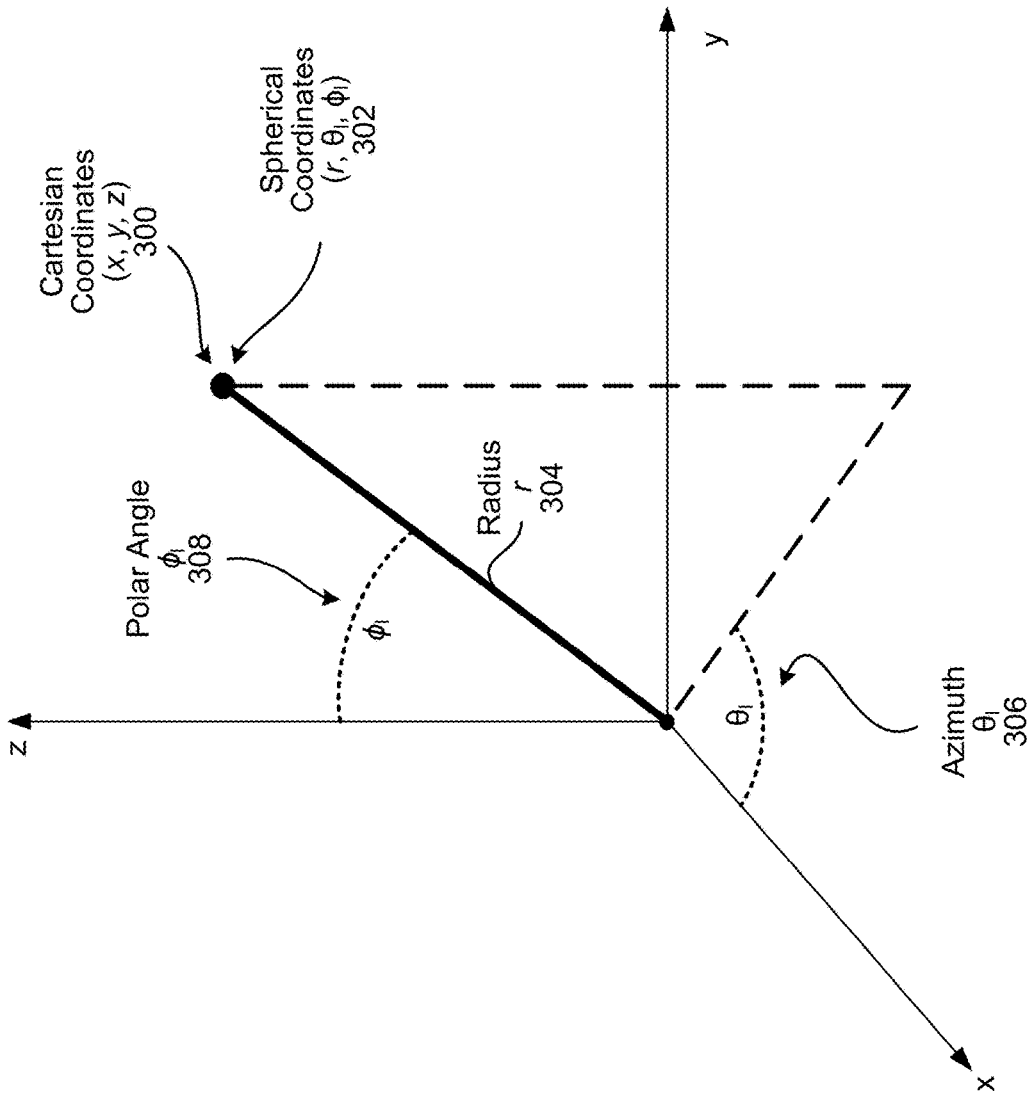
FIG. 3 illustrates an example of spherical coordinates.

FIG. 3 illustrates an example of spherical coordinates, which may be used throughout the disclosure with reference to acoustic waves relative to the microphone array. As illustrated in FIG. 3, Cartesian coordinates (x, y, z) 300 correspond to spherical coordinates (r, $\theta_1$, $\phi_1$) 302. Thus, using Cartesian coordinates, a location may be indicated as a point along an x-axis, a y-axis, and a z-axis using coordinates (x, y, z), whereas using spherical coordinates the same location may be indicated using a radius r 304, an azimuth $\theta_1$ 306 and a polar angle $\phi_1$ 308. The radius r 304 indicates a radial distance of the point from a fixed origin, the azimuth $\theta_1$ 306 indicates an azimuth angle of its orthogonal projection on a reference plane that passes through the origin and is orthogonal to a fixed zenith direction, and the polar angle $\phi_1$ 308 indicates a polar angle measured from the fixed zenith direction. Thus, the azimuth $\theta_1$ 306 varies between 0 and 360 degrees, while the polar angle $\phi_1$ 308 varies between 0 and 180 degrees.

Figure 4A:
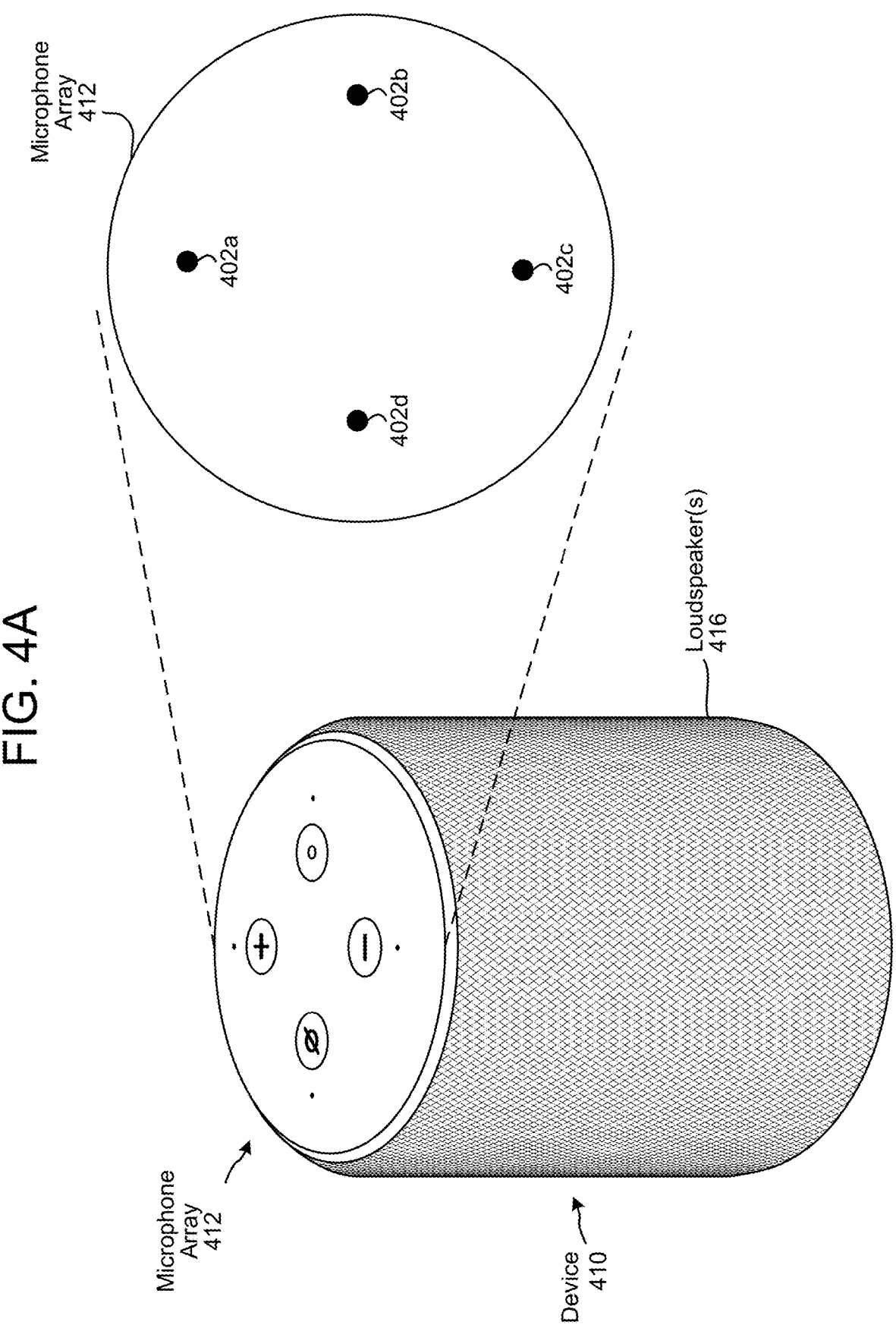
Figure 4C:
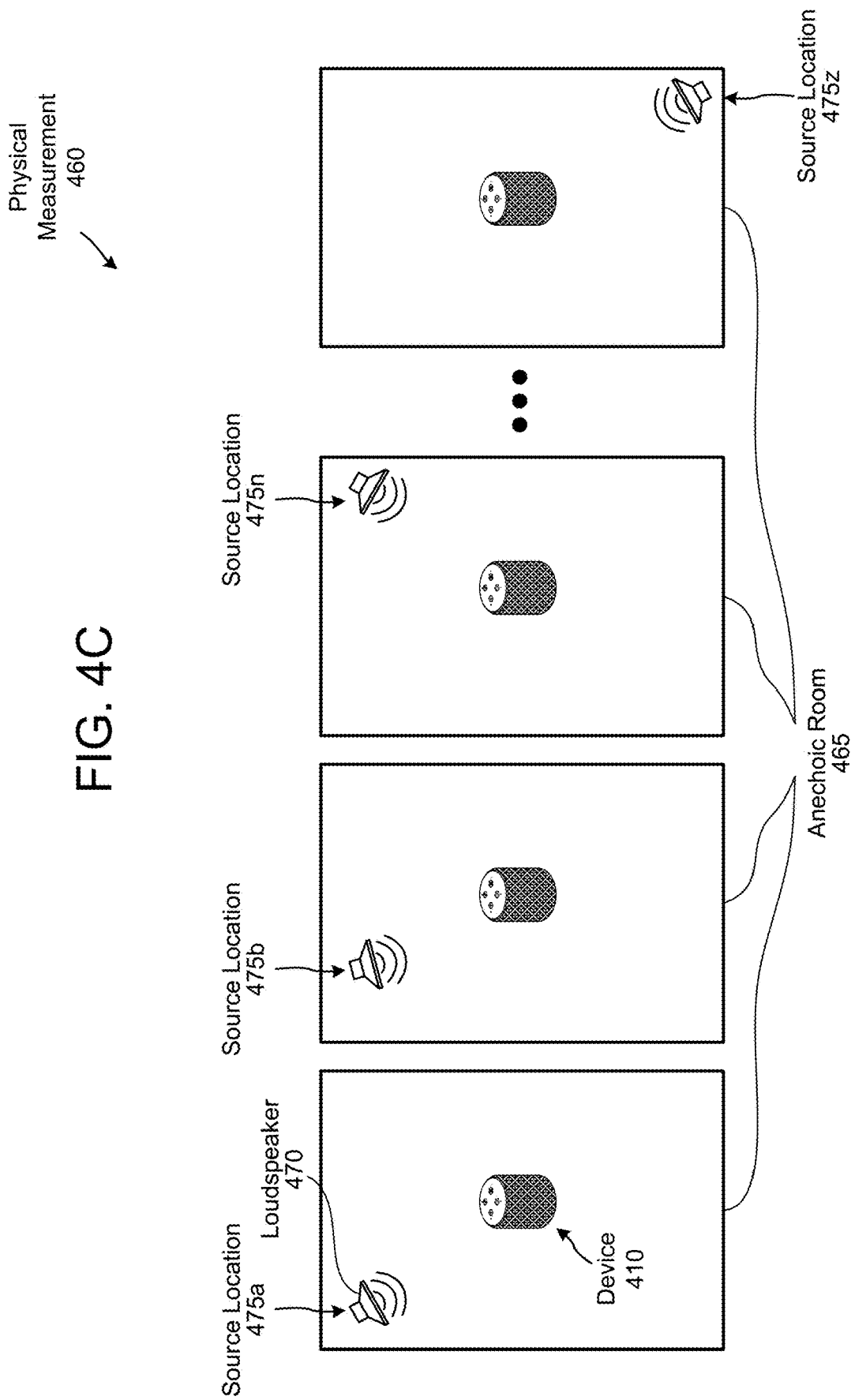

FIGS. 4A-4C illustrate a device having a microphone array and examples of determining a device response via simulation or measurement according to embodiments of the present disclosure. As illustrated in FIG. 4A, a device 410 may include, among other components, a microphone array 412, one or more loudspeaker(s) 416, and other components not illustrated in FIG. 4A. The microphone array 412 may include a number of different individual microphones 402. In the example configuration illustrated in FIG. 4A, the microphone array 412 includes four (4) microphones 402a-402d, although the disclosure is not limited thereto and the number of microphones 402 may vary without departing from the disclosure.

In some examples, the device 410 illustrated in FIG. 4A may correspond to one of the device(s) 110 described above with regard to FIG. 1. For example, the system 100 may determine device acoustic characteristics data associated with the device 110 and the device 110 may use the device acoustic characteristics data to perform angle of arrival estimation during operation.

The acoustic wave equation is the governing law for acoustic wave propagation in fluids, including air. In the time domain, the homogenous wave equation has the form:

$$\nabla^2 \overline{p} - \frac{1}{c^2}\frac{\partial^2 \overline{p}}{\partial t^2} = 0 \qquad [1a]$$

where p(t) is the acoustic pressure and c is the speed of sound in the medium. Alternatively, the acoustic wave equation may be solved in the frequency domain using the Helmholtz equation to find p(f):

$$\nabla^2 p + k^2 p = 0 \qquad [1b]$$

where $k \triangleq 2\pi f/c$ is the wave number. At steady state, the time-domain and the frequency-domain solutions are Fourier pairs. The boundary conditions are determined by the geometry and the acoustic impedance of the difference boundaries. The Helmholtz equation is typically solved using Finite Element Method (FEM) techniques, although the disclosure is not limited thereto and the device 110 may solve using boundary element method (BEM), finite difference method (FDM), and/or other techniques without departing from the disclosure.

To analyze the microphone array 412, the system 100 may determine device acoustic characteristics data associated with the device 410. For example, the device acoustic characteristics data represents scattering due to the device surface (e.g., acoustic plane wave scattering caused by a surface of the device 410). Therefore, the system 100 needs to compute the scattered field at all microphones 402 for each plane-wave of interest impinging on a surface of the device 410. The total wave-field at each microphone of the microphone array 412 when an incident plane-wave $p_i(k)$ impinges on the device 410 has the general form:

$$p_t = p_i + p_s \quad [2]$$

where $p_t$ is the total wave-field, $p_i$ is the incident plane-wave, and $p_s$ is the scattered wave-field.

The device acoustic characteristics data may represent the acoustic response of the device 410 associated with the microphone array 412 to each acoustic wave of interest. The device acoustic characteristics data may include a plurality of vectors, with a single vector corresponding to a single acoustic wave. The number of acoustic waves may vary, and in some examples the acoustic characteristics data may include acoustic plane waves, spherical acoustic waves, and/or a combination thereof. In some examples, the device acoustic characteristics data may include 1024 frequency bins (e.g., frequency ranges) up to a maximum frequency (e.g., 8 kHz, although the disclosure is not limited thereto).

The entries (e.g., values) for a single vector represent an acoustic pressure indicating a total field at each microphone (e.g., incident acoustic wave and scattering caused by the microphone array) for a particular background acoustic wave. Each entry of the device acoustic characteristics data has the form $\{z(\omega,\phi,\theta)\}_{\omega,\phi,\theta}$, which represents the acoustic pressure vector (at all microphones) at frequency $\omega$, for an acoustic wave of elevation $\phi_1$ and azimuth $\theta_1$. Thus, a length of each entry of the device acoustic characteristics data corresponds to a number of microphones included in the microphone array.

These values may be simulated by solving a Helmholtz equation or may be directly measured using a physical measurement in an anechoic room (e.g., a room configured to deaden sound, such that there is no echo) with a distance point source (e.g., loudspeaker). For example, using techniques such as finite element method (FEM), boundary element method (BEM), finite difference method (FDM), and/or the like, the system 100 may calculate the total wave-field at each microphone. Thus, a number of entries in each vector corresponds to a number of microphones in the microphone array, with a first entry corresponding to a first microphone, a second entry corresponding to a second microphone, and so on.

In some examples, the system 100 may determine the device acoustic characteristics data by simulating the microphone array 412 using wave-based acoustic modeling. For example, FIG. 4B illustrates an example using a finite element method (FEM), which models the device 410 using a FEM mesh 450. To have a true background acoustic wave, the external boundary should be open and non-reflecting. To mimic an open-ended boundary, the system 100 may use a perfectly matched layer (PML) 452 to define a special absorbing domain that eliminates reflection and refractions in the internal domain that encloses the device 410. While FIG. 4B illustrates using FEM processing, the disclosure is not limited thereto and the system 100 may use boundary element method (BEM) processing and/or other wave-based acoustic modeling techniques without departing from the disclosure.

The system 100 may calculate the total wave-field at all frequencies of interest with a background acoustic wave, where the surface of the device 410 is modeled as a sound hard boundary. If a surface area of an individual microphone is much smaller than a wavelength of the acoustic wave, the microphone is modeled as a point receiver on the surface of the device 410. If the surface area is not much smaller than the wavelength, the microphone response is computed as an integral of the acoustic pressure over the surface area.

Using the FEM model, the system 100 may calculate an acoustic pressure at each microphone (at each frequency) by solving the Helmholtz equation numerically with a background acoustic wave. This procedure is repeated for each possible acoustic wave and each possible direction to generate a full dictionary that completely characterizes a behavior of the device 410 for each acoustic wave (e.g., device response for each acoustic wave). Thus, the system 100 may simulate the device acoustic characteristics data and may associate the device acoustic characteristics data with the device 110.

In other examples, the system 100 may determine the device acoustic characteristics data described above by physical measurement 460 in an anechoic room 465, as illustrated in FIG. 4C. For example, the system 100 may measure acoustic pressure values at each of the microphones 402 in response to an input (e.g., impulse) generated by a loudspeaker 470. The input may correspond to white noise or other waveforms, and may include a frequency sweep across all frequency bands of interest (e.g., input signal includes white noise within all desired frequency bands).

To model all of the potential acoustic waves, the system 100 may generate the input using the loudspeaker 470 in all possible locations in the anechoic room 465. For example, FIG. 4C illustrates examples of the loudspeaker 470 generating inputs at multiple source locations 475 along a horizontal direction, such as a first input at a first source location 475a, a second input at a second source location 475b, and so on until an n-th input at an n-th source location 475n. This is intended to illustrate that the loudspeaker 470 generates the input at every possible source location 475 associated with a first horizontal row. In addition, the system 100 may generate the input using the loudspeaker 470 at every possible source location 475 in every horizontal row without departing from the disclosure. Thus, the loudspeaker 470 may generate inputs at every possible source location 475 throughout the anechoic room 465, until finally generating a z-th input at a z-th source location 475z.

Figure 5:
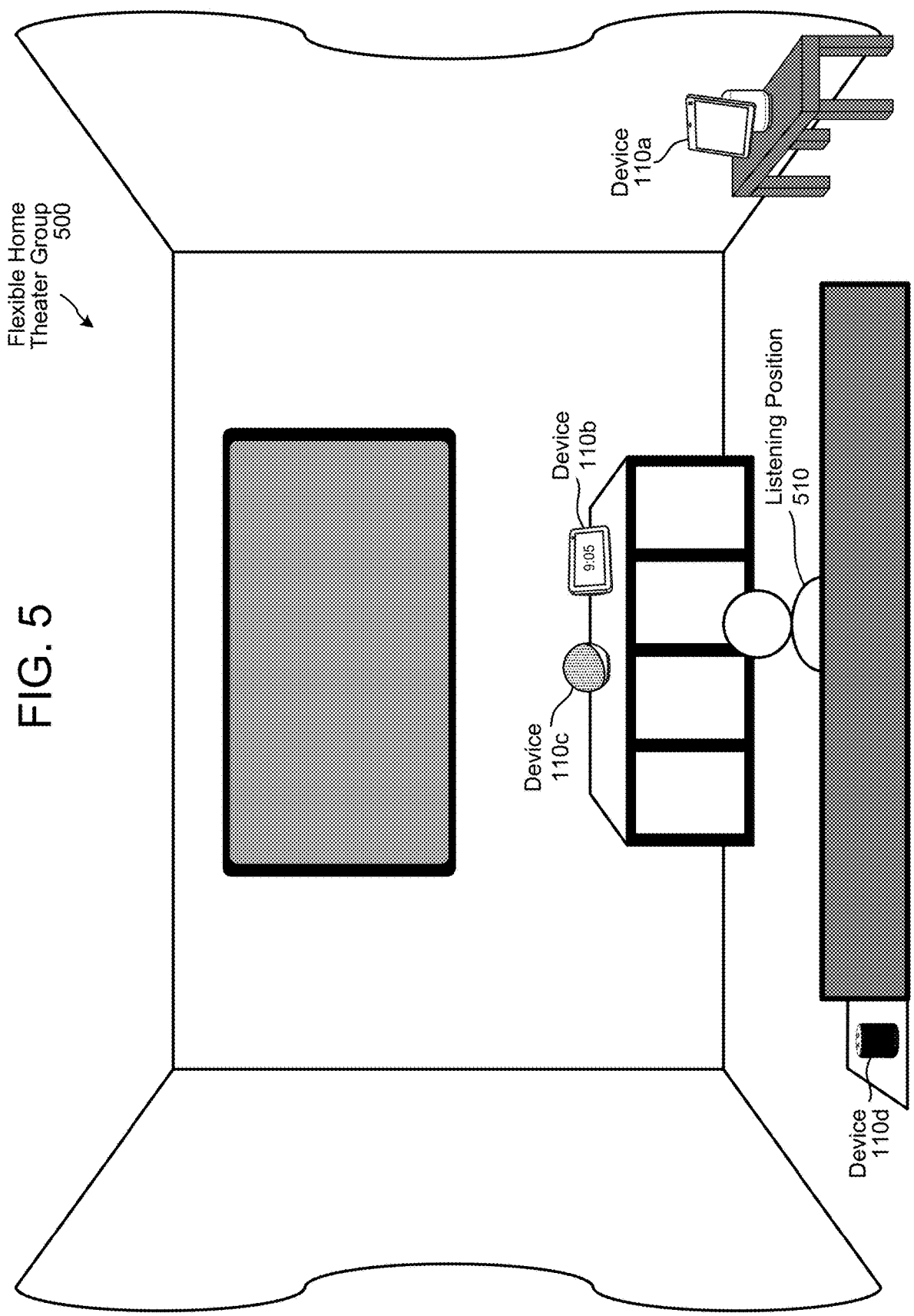
FIG. 5 illustrates an example of a flexible home theater according to embodiments of the present disclosure.

FIG. 5 illustrates an example of a flexible home theater according to embodiments of the present disclosure. As illustrated in FIG. 5, a flexible home theater group 500 may comprise a variety of devices 110 without departing from the disclosure. For example, FIG. 5 illustrates an example home theater that includes a first device 110a (e.g., device with a screen) at a first location to the right of a listening position 510 of the user, a second device 110b (e.g., device with a screen) at a second location below the television to the right of the listening position 510, a third device 110c (e.g., device configured with an audio user interface) at a third location below the television to the left of the listening position 510, and a fourth device 110d (e.g., device configured with an audio user interface) at a fourth location to the left of the listening position 510. However, the disclosure is not limited thereto and the flexible home theater group 500 may include additional devices 110 without departing from the disclosure. For example, the flexible home theater group 500 may include another device 110 (e.g., television or headless device associated with the television) without departing from the disclosure. Additionally or alternatively, the flexible home theater group 500 may include fewer devices 110 and/or the locations of the devices 110 may vary without departing from the disclosure.

Despite the flexible home theater group 500 including multiple different types of devices 110 in an asymmetrical configuration relative to the listening position 510 of the user, in some examples the system 100 may generate playback audio optimized for the listening position 510. For example, the system 100 may generate map data indicating the locations of the devices 110, the type of devices 110, and/or other context (e.g., number of loudspeakers, frequency response of the drivers, etc.), and may send the map data to a rendering component. The rendering component may generate individual renderer coefficient values for each of the devices 110, enabling each individual device 110 to generate playback audio that takes into account the location of the device 110 and characteristics of the device 110 (e.g., frequency response, etc.).

To illustrate a first example, the second device 110b may act as a left channel and the third device 110c may act as a right channel in the flexible home theater group 500, despite not being positioned symmetrically relative to the television. For example, first renderer coefficient values associated with the second device 110b may adjust first playback audio generated by the second device 110b to shift the sound stage a first distance to the right from the perspective of the listening position 510, while second renderer coefficient values associated with the third device 110c may adjust second playback audio generated by the third device 110c to shift the sound stage a second distance to the left from the perspective of the listening position 510. Thus, the second renderer coefficient values may compensate for the asymmetric placement of the third device 110c. To illustrate a second example, the fourth device 110d may act as a left surround channel and the first device 110a may act as a right surround channel in the flexible home theater group 500, despite being different distances from the listening position 510. For example, third renderer coefficient values associated with the fourth device 110d may adjust third playback audio generated by the fourth device 110d, while fourth renderer coefficient values associated with the first device 110a may adjust fourth playback audio generated by the first device 110a such that the two channels are balanced from the perspective of the listening position 510.

In order to generate the rendering coefficient values, the system 100 may perform device localization to generate a device map indicating relative positions of the devices 110a-110d. In some examples, the system 100 may cause each device 110 included in the flexible home theater group 500 to generate audible sounds representing a calibration tone during a calibration sequence. For example, a first device (e.g., Device1) may generate a first audible sound during a first time range, a second device (e.g., Device2) may generate a second audible sound during a second time range, and so on, according to the calibration sequence.

During the calibration sequence, the first device 110a may generate first audio data capturing one or more audible sounds and may perform angle of arrival estimation processing to determine direction(s) associated with the audible sound(s) represented in the first audio data. For example, if the second device 110b is generating the second audible sound during the second time range, the first device 110a may capture a representation of the second audible sound and perform angle of arrival estimation processing to determine that the second device 110b is in a first direction relative to the first device 110a, although the disclosure is not limited thereto. As described above, the first device 110a may indicate the first direction as a first estimated angle of arrival, a first azimuth value, and/or the like without departing from the disclosure. Similarly, if the third device 110c is generating the third audible sound during a third time range, the first device 110a may capture a representation of the third audible sound and perform angle of arrival estimation processing to determine that the third device 110c is in a second direction relative to the first device 110a, although the disclosure is not limited thereto.

While FIG. 5 illustrates the first device 110a as being included in the flexible home theater group 500, the disclosure is not limited thereto. In some examples, the first device 110a may perform angle of arrival estimation processing for a second device 110b regardless of a configuration, location, relative placement, and/or the like associated with the second device 110b. Additionally or alternatively, while the example described above refers to the first device 110a generating the first audio data as part of a calibration sequence, the disclosure is not limited thereto. For example, the first device 110a may generate the first audio data and determine the estimated angle of arrival for the second device 110b without participating in a calibration sequence and/or without the first device 110a generating the calibration tone without departing from the disclosure. Thus, the first device 110a may determine the estimated angle of arrival for any device 110 in proximity to the first device 110a, without either device 110 being part of the flexible home theater group 500, without departing from the disclosure.

Figure 6:
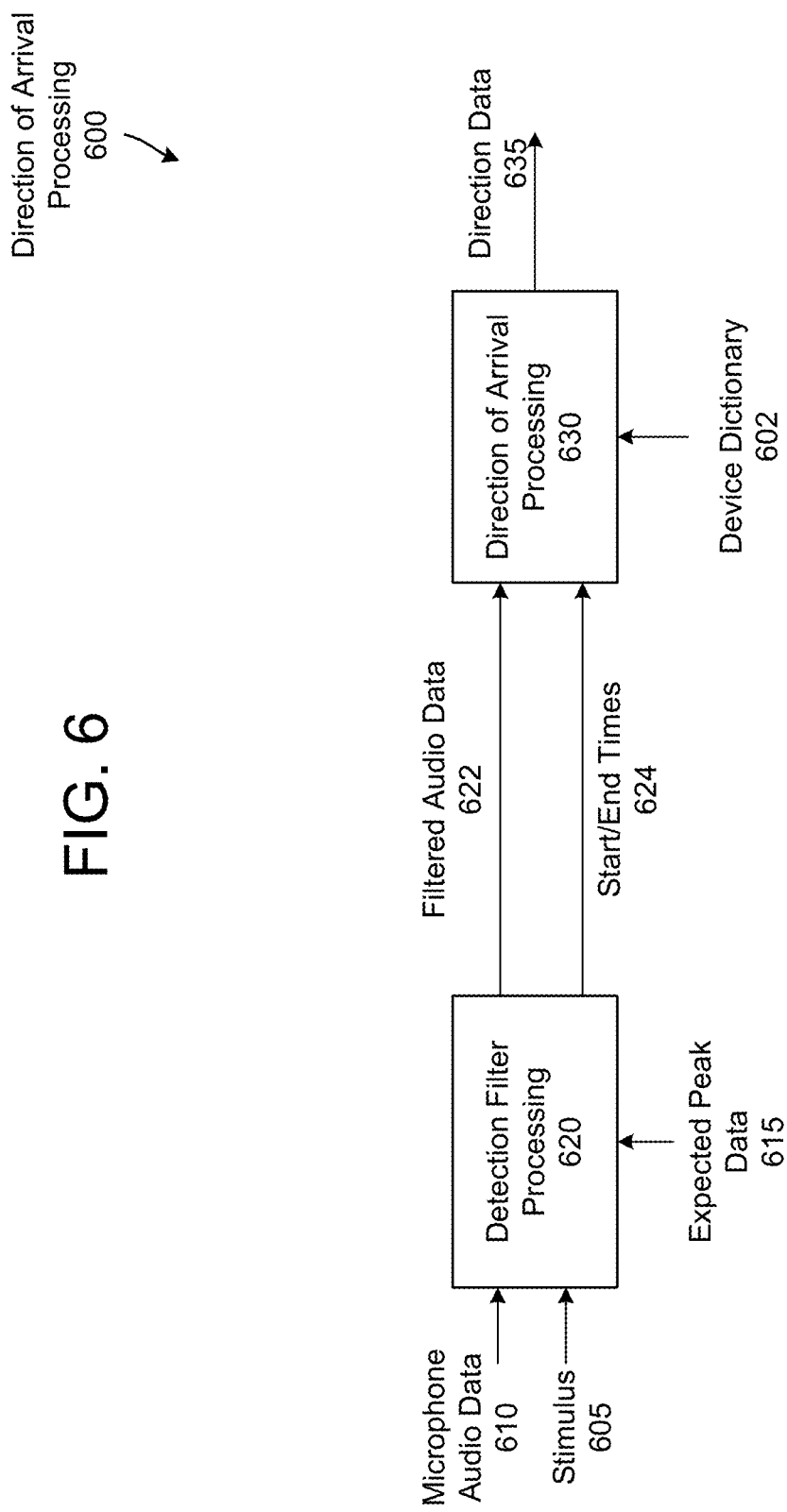
FIG. 6 illustrates an example component diagram for performing direction of arrival processing according to embodiments of the present disclosure.

FIG. 6 illustrates an example component diagram for performing direction of arrival processing according to embodiments of the present disclosure. As illustrated in FIG. 6, direction of arrival processing 600 may include a detection filter component 620 and a direction of arrival processing component 630 that are configured to generate direction data (e.g., azimuth data and/or elevation data). For example, each device 110 may be configured to perform direction of arrival processing using an individual detection filter component 620 and direction of arrival processing component 630 without departing from the disclosure.

As illustrated in FIG. 6, the detection filter component 620 may receive a stimulus 605 (e.g., stimulus data, calibration data, etc.) corresponding to the calibration tone, microphone audio data 610 generated by one or more microphones of the local device, and expected peak data 615. Using these inputs, the detection filter component 620 may determine filtered audio data 622 and/or start/end times 624, as will be described in greater detail below with regard to FIG. 7. As illustrated in FIG. 6, the detection filter component 620 may output the filtered audio data 622 and/or the start/end times 624 to the direction of arrival processing component 630.

In some examples, the expected peak data 615 may correspond to expected locations at which the system 100 expects to detect peaks based on a repeating pattern associated with the calibration sequence. For example, if the calibration sequence has a repeating structure, such as a consistent duration of time between stimulus playback and the stimulus signal, the system 100 may predict when peaks corresponding to the stimulus signal will occur. However, the system 100 may only generate the expected peak data 615 based on knowledge of timing associated with a first stimulus. Thus, the detection filter component 620 may generate the filtered audio data 622 and/or the start/end times 624 without using the expected peak data 615 without departing from the disclosure. Additionally or alternatively, in some examples the expected peak data 615 may indicate a number of devices included in the calibration sequence, such that the detection filter component 620 may determine a number of peaks that will be represented in a particular time interval.

The AWD local processing component may receive the filtered audio data 622 and/or the start/end times 624 from the detection filter component 620 and may use the filtered audio data 622 and/or the start/end times 624 to generate direction data 635 indicating relative directions associated with the devices. For example, the direction of arrival processing component 630 may perform angle of arrival estimation processing to generate the direction data 635 and then may output the direction data 635 to the primary device, although the disclosure is not limited thereto.

Figure 7:
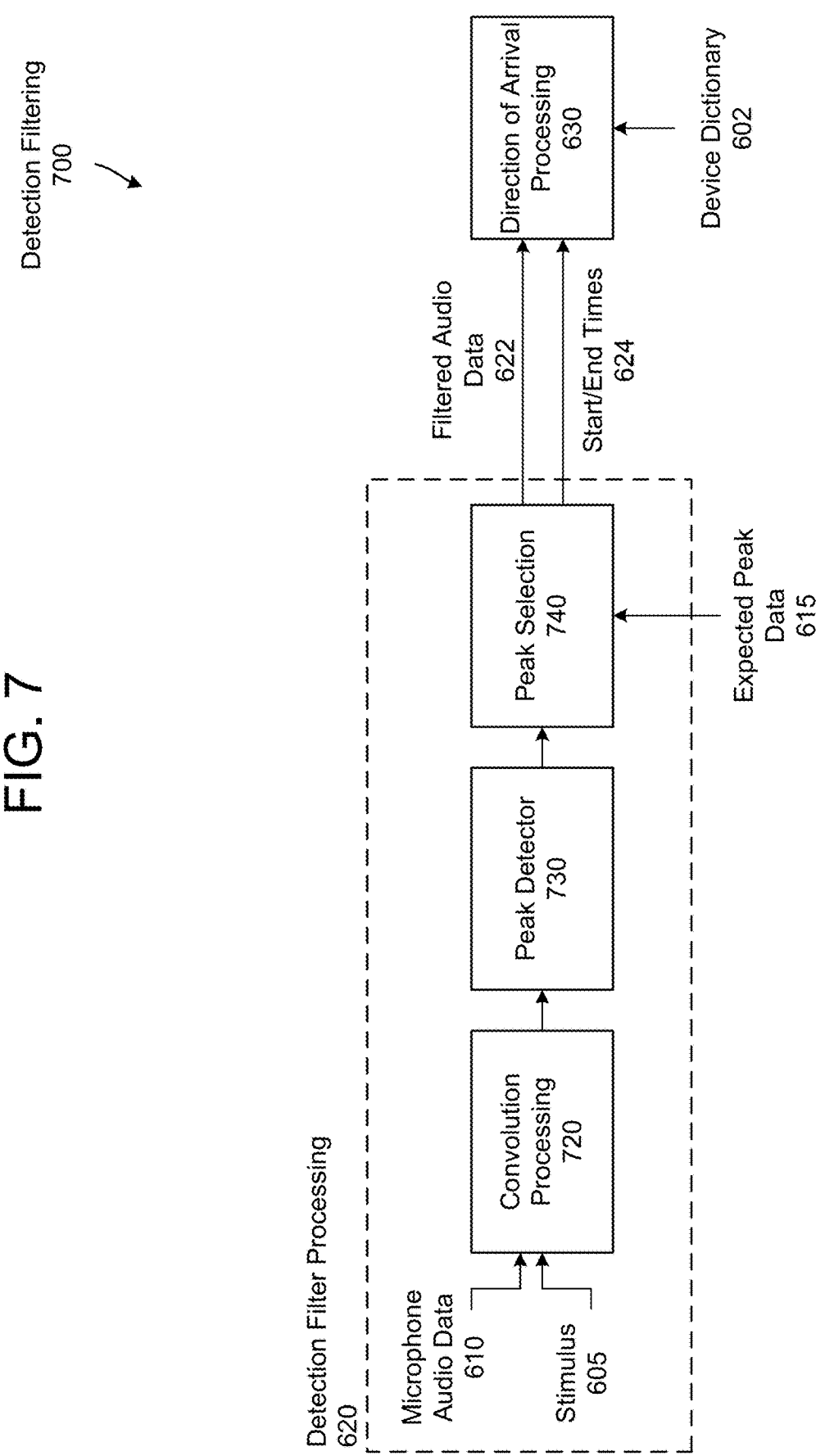
FIG. 7 illustrates an example component diagram for performing detection filtering according to embodiments of the present disclosure.

FIG. 7 illustrates an example component diagram for performing detection filtering according to embodiments of the present disclosure. As illustrated in FIG. 7, a device 110 may perform detection filtering 700 using the detection filter component 620 described in greater detail above with regard to FIG. 6. For example, the detection filter component 620 may be configured to perform detection filtering using the stimulus 605 (e.g., calibration data) and the microphone audio data 610 to detect a calibration tone and identify a first peak (e.g., direct-path peak) represented in the microphone audio data 610. However, the disclosure is not limited thereto and the detection filter component 620 may be configured to detect any known stimulus (e.g., excitation signal) without departing from the disclosure.

As used herein, the device 110 may perform detection filtering by convolving a linear filter, such as matched filters, inverse filters, and/or the like without departing from the disclosure. Thus, for ease of illustration, detection filtering may be referred to as matched filtering, inverse filtering, and/or the like without departing from the disclosure. Similarly, while the stimulus 605 may be described with reference to a calibration tone, the disclosure is not limited thereto and the stimulus 605 may correspond to any known signal that the device 110 may use to detect the direct-path peak associated with another device.

As illustrated in FIG. 7, the detection filter component 620 may include a convolution processing component 720 configured to receive the microphone audio data 610 and compare the microphone audio data 610 to the stimulus 605. In some examples, the convolution processing component 720 may be configured to determine a cross-correlation between the stimulus 605 and the microphone audio data 610, although the disclosure is not limited thereto. For ease of illustration, the description may refer to convolution processing and cross-correlation processing interchangeably without departing from the disclosure. Thus, the convolution processing component 720 may be configured to perform a convolution to generate convolution data, may be configured to perform a cross-correlation to generate cross-correlation data, and/or the like without departing from the disclosure.

As described above, during calibration each of the devices 110 in the flexible home theater group may generate an audible sound using a calibration tone. In the example illustrated in FIG. 7, the first device 110*a* may generate microphone audio data 610 that includes a representation of an audible sound output by the second device 110*b*, which was generated using a calibration tone that corresponds to the stimulus 605. Thus, the first device 110*a* may use the stimulus 605 to detect the audible sound represented in the microphone audio data 610.

In some examples, the convolution processing component 720 may be configured to generate convolution data by performing a convolution between the microphone audio data 610 and the calibration stimulus 605 (e.g., calibration data). For example, the convolution processing component 720 may generate the convolution data by determining a cross-correlation between the calibration stimulus 605 (e.g., calibration tone output by each device) and the microphone audio data 610 associated with an individual microphone.

The convolution processing component 720 may send the convolution data to a peak detector component 730. Using the peak detector component 730 and/or a peak selection component 740, the device 110 may process the convolution data to determine filtered audio data 622 and/or start/end times 624. For example, the peak detector component 730 may locate a plurality of peaks represented in the convolution data and the peak selection component 740 may filter and select direct-path peak(s) from the plurality of peaks.

To illustrate an example, the peak detector component 730 and/or the peak selection component 740 may identify a plurality of peaks represented in the convolution data and select a first peak that corresponds to a direct-path peak associated with the audible sound generated by the second device 110*b*. In some examples, the detection filter component 620 may generate a dynamic threshold using a percentile tracker and detect the first peak that rises about the dynamic threshold. For example, the detection filter component 620 may track a $p^{th}$ percentile (e.g., $99^{th}$ percentile) and generate the dynamic threshold using the $p^{th}$ percentile, although the disclosure is not limited thereto.

After detecting the first peak, the detection filter component 620 may select a portion of the convolution data corresponding to the first peak and/or determine the start/end times 624 corresponding to the first peak. For example, the detection filter component 620 may select the portion of the convolution data that surrounds the direct-path peak and use this portion to generate the filtered audio data 622. However, the disclosure is not limited thereto, and in other examples the detection filter component 620 may determine the start/end times 624 associated with the portion of the convolution data and may generate the filtered audio data 622 using the microphone audio data 610 and the start/end times 624. For example, the detection filter component 620 may select a portion of the microphone audio data 610 associated with the start/end times 624 and may convert the portion of the microphone audio data 610 to the frequency-domain. Thus, the detection filter component 620 may perform match filtering and peak filtering to generate the filtered audio data 622 and/or the start/end times 624 corresponding to the audible sound represented in the microphone audio data 610.

While not illustrated in FIG. 7, the first device 110*a* may perform these steps for multiple microphones 112 without departing from the disclosure. For example, if the first device 110*a* includes four microphones 112, the detection filter component 620 may perform detection filtering for each of the four microphones 112 without departing from the disclosure.

In some examples, the first device 110*a* may perform detection filtering using only a subset of the microphones 112 without departing from the disclosure. For example, if the first device 110*a* includes eight microphones, the first device 110*a* may only perform detection filtering using four of the microphones 112 without departing from the disclosure.

As illustrated in FIG. 7, the detection filter component 620 may output the filtered audio data 622 and/or the start/end times 624 to the direction of arrival processing component 630. As will be described in greater detail below with regard to FIG. 10, the direction of arrival processing component 630 may use the filtered audio data 622, the start/end times 624, and/or the device dictionary 602 to perform angle of arrival estimation and determine an angle of arrival (e.g., device azimuth) associated with the second device 110b. In some examples, the direction of arrival processing component 630 may generate direction data 635 that includes a variance corresponding to the angle of arrival, although the disclosure is not limited thereto.

As described above, in some examples the system 100 (e.g., primary device) may generate configuration data indicating an order in which the devices 110 will generate playback audio during a calibration sequence. For example, the configuration data may indicate that a first device (Device1) will generate a first audible sound during a first time range, a second device (Device2) will generate a second audible sound during a second time range, a third device (Device3) will generate a third audible sound during a third time range, and a fourth device (Device4) will generate a fourth audible sound during a fourth time range. While all four devices are listening and capturing audio during the entire calibration sequence, the devices only generate audible sounds during the designated time range indicated by the configuration data. However, the disclosure is not limited thereto and the system 100 may perform direction of arrival processing between any pair of devices 110 without departing from the disclosure. For example, in some examples the system 100 may perform direction of arrival processing between the first device 110a and the second device 110b, without performing a calibration sequence and/or using configuration data, without departing from the disclosure.

Figure 8A:
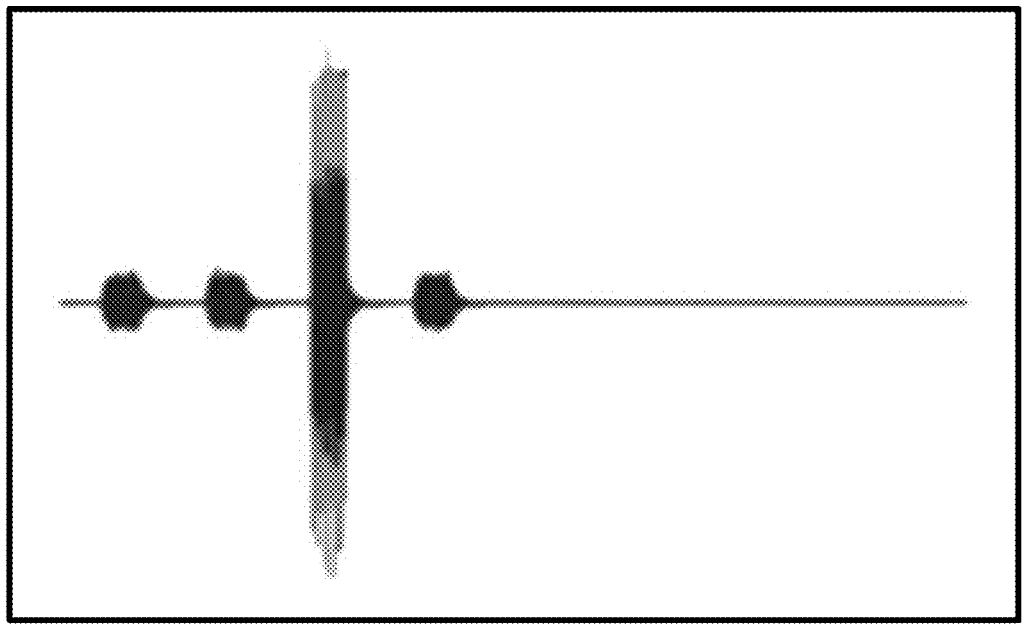
FIGS. 8A-8B illustrate examples of performing cross-correlation to detect first peaks used to perform direction of arrival processing according to embodiments of the present disclosure.
Figure 8A:
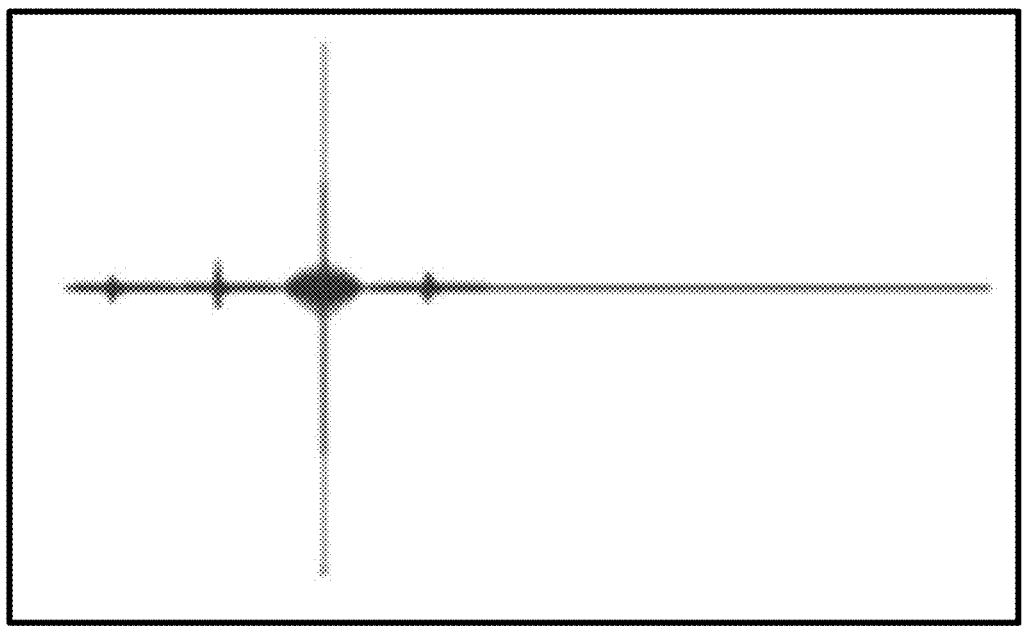
Figure 8B:
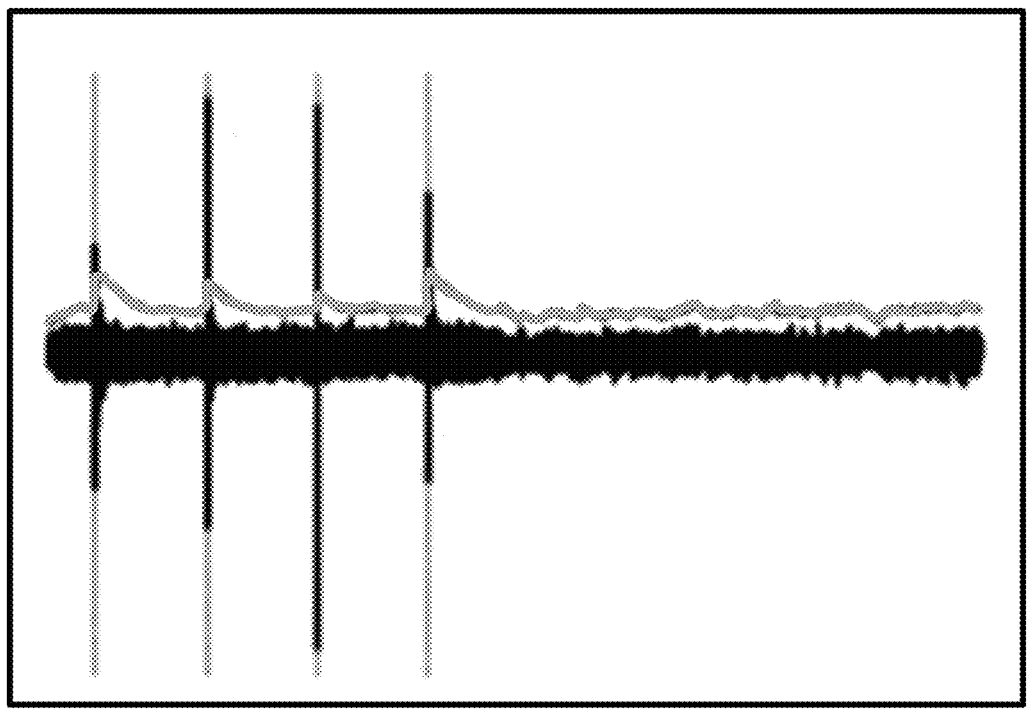
Figure 8B:
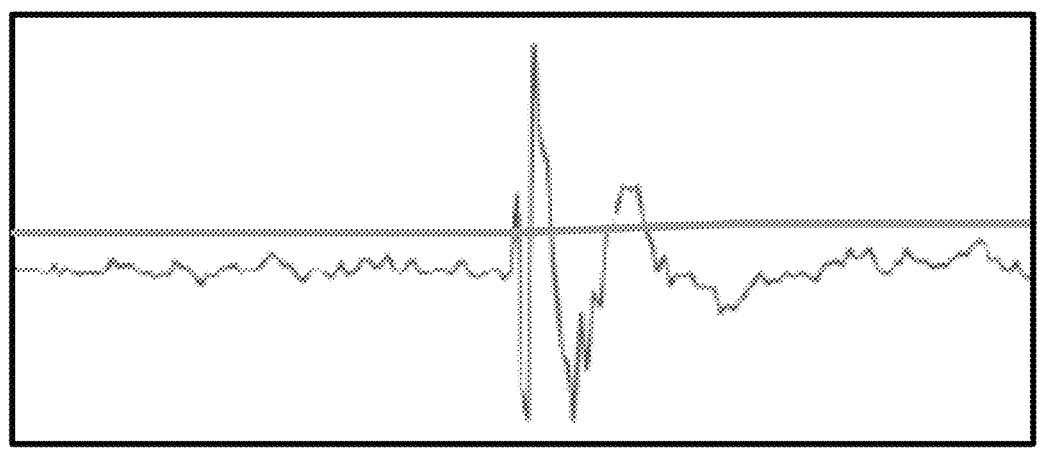

FIGS. 8A-8B illustrate examples of performing cross-correlation to detect first peaks used to perform direction of arrival processing according to embodiments of the present disclosure. FIG. 8A illustrates an example of raw device capture 810, which represents the microphone audio data 610, and raw cross-correlation 820, which illustrates an example of cross-correlation data (e.g., convolution data). As described above, the system 100 may generate the raw cross-correlation data 820 by performing a convolution between the raw device capture 810 (e.g., microphone audio data) and calibration data representing a calibration tone. For example, the system 100 may determine a cross-correlation between the raw device capture 810 and the calibration data, although the disclosure is not limited thereto. In some examples, the system 100 may normalize the cross-correlation data and generate rolling-norm cross-correlation 830, illustrated in FIG. 8B.

To perform peak detection, the system 100 may generate a dynamic threshold, represented as a gray line in the rolling-norm cross-correlation 830. For example, the detection filter component 620 may locate peaks represented in the cross-correlation data and may filter and select the peaks from the cross-correlation data. As discussed above, in some examples the detection filter component 620 may generate the dynamic threshold using a percentile tracker, although the disclosure is not limited thereto. For example, the detection filter component 620 may track a pth percentile (e.g., 99th percentile) and generate the dynamic threshold using the pth percentile, although the disclosure is not limited thereto.

As illustrated in FIG. 8B, the system 100 may identify a first peak represented in the cross-correlation data by identifying the first peak that cross this dynamic threshold. For example, first peak detection 840 illustrates a portion of the rolling-norm cross-correlation 830 where the cross-correlation data first exceeds the dynamic threshold.

While not illustrated in FIG. 8B, the system 100 may repeat this process to determine first peak(s) for each of the audible sounds (e.g., each individual calibration tone) represented in the microphone audio data 610. As described above, the system 100 may use these first peak(s) to isolate audio data corresponding to the direct-path peak for each audible sound. For example, the first device 110a may determine a first peak associated with the second audible sound generated by the second device 110b and may use the first peak to select a first portion of the microphone audio data 610 that represents the second audible sound. Similarly, the first device 110a may determine a second peak associated with a third audible sound generated by the third device 110c and may use the second peak to select a second portion of the microphone audio data 610 that represents the third audible sound. Thus, the first deice 110a may repeat this process to detect the earliest peak (e.g., direct-path peak) for each audible sound represented in the microphone audio data 610.

Figure 9:
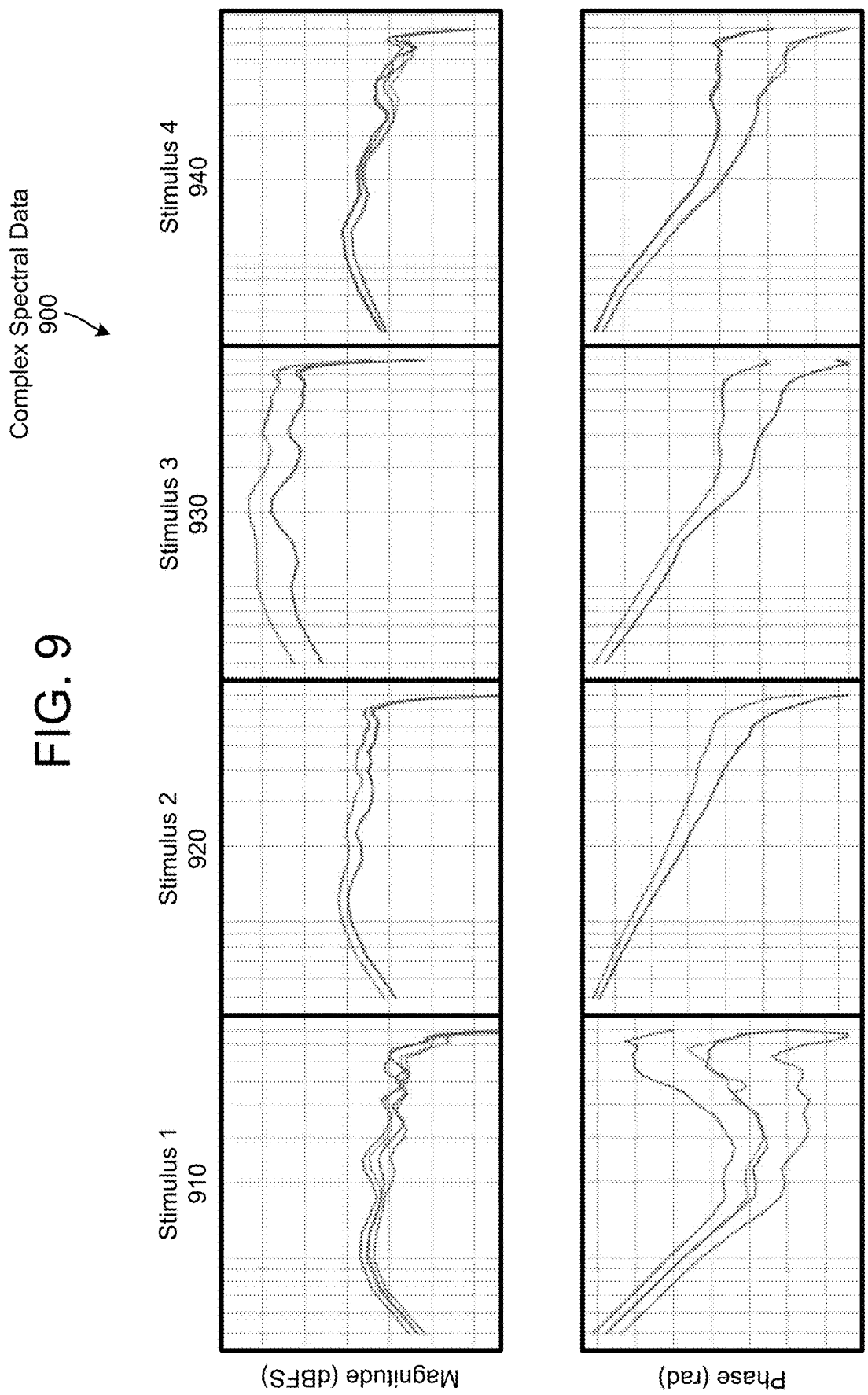
FIG. 9 illustrates examples of magnitude and phase information associated with isolated peaks according to embodiments of the present disclosure.

FIG. 9 illustrates examples of magnitude and phase information associated with isolated peaks according to embodiments of the present disclosure. As represented by complex spectral data 900 illustrated in FIG. 9, the first device 110 may perform angle of arrival estimation after a calibration sequence involving a group of four devices 110a-110d. The group of four devices 110a-110d may be similar to the flexible home theater group 500 illustrated in FIG. 5, except in the example illustrated in FIG. 9 the four devices are aligned evenly and symmetrically.

To illustrate an example, the complex spectral data 900 corresponds to a configuration in which the four devices 110a-110d are arranged as four corners of a square, with an equal distance separating the first device 110a from the second device 110b in a first direction and the fourth device 110d in a second direction perpendicular to the first direction. Likewise, the third device 110c is located in an opposite corner from the first device 110a, with an equal distance separating the third device 110c from the fourth device 110d in the first direction and the second device 110b in the second direction.

In the configuration described above, the third device 110c may correspond to an upper right corner of the square and a first calibration tone generated by the third device 110c is represented by first complex spectral data 910 (e.g., Stimulus 1), which illustrates a spectrum of the first peak. Similarly, the fourth device 110d may correspond to an upper left corner of the square and a second calibration tone generated by the second device 110b is represented by second complex spectral data 920 (e.g., Stimulus 2), which illustrates a spectrum of the second peak. The first device 110a may correspond to a bottom left corner of the square and a third calibration tone generated by the first device 110a is represented by third complex spectral data 930 (e.g., Stimulus 3), which illustrates a spectrum of the third peak. Finally, the second device 110b may correspond to a bottom right corner of the square and a fourth calibration tone generated by the second device 110b is represented by fourth complex spectral data 940 (e.g., Stimulus 4), which illustrates a spectrum of the fourth peak.

As described above, the first device 110a may perform detection filtering to isolate audio data associated with the first peaks for each of the four devices 110a-110d and may convert the isolated audio data from the time-domain to the frequency-domain, which may be illustrated as complex spectral data. However, the disclosure is not limited thereto and the first device 110a may perform detection filtering to isolate audio data associated with a single device (e.g., separate from a calibration sequence) without departing from the disclosure.

As illustrated in FIG. 9, the complex spectral data 900 includes a magnitude measured in decibels relative to full scale (dBFS), and a phase measured in radians (rad), for each of four microphones 112a-112d associated with the first device 110a. By observing the differences in magnitude and/or phase between the four microphones 112a-112d, the first device 110a may determine a relative direction associated with each of the other devices 110b-110d.

As illustrated by the first complex spectral data 910 shown in FIG. 9, for example, a pair of microphones have similar phase values, indicating that both microphones are located a similar distance from the third device 110c. However, a third microphone appears to be closer than the pair of microphones while a fourth microphone appears to be further away. This corresponds to the first calibration tone generated by the third device 110c arriving at a 45 degree angle from the opposite corner of the square.

In contrast, the second complex spectral data 920 indicates that two pairs of microphones have similar magnitude values and phase values, such that the second complex spectral data 920 appears to only show two signals. For example, a top signal represented by the second complex spectral data 920 corresponds to a first pair of microphones (e.g., 112a/112b), while a bottom signal represented by the second complex spectral data 920 corresponds to a second pair of microphones (e.g., 112c/112d). This corresponds to the second calibration tone generated by the fourth device 110d arriving at a perpendicular angle relative to the first pair of microphones and/or the second pair of microphones.

Meanwhile, the fourth complex spectral data 940 appears to be similar as the magnitude and phase are grouped into two pairs of microphones as well. However, the four microphones are paired differently, with the top signal represented by the fourth complex spectral data 940 corresponding to a third pair of microphones (e.g., 112a/112c), while the bottom signal represented by the fourth complex spectral data 940 corresponds to a fourth pair of microphones (e.g., 112b/112d). Thus, the first device 110a may interpret the second complex spectral data 920 as corresponding to a first direction and the fourth complex spectral data 940 as corresponding to a second direction perpendicular to the first direction, although the disclosure is not limited thereto.

Finally, as the third complex spectral data 930 has a larger magnitude than the other signals, the third complex spectral data 930 corresponds to the first device 110a performing self-capture and capturing the third calibration tone that was generated by the first device 110a.

FIG. 10 illustrates examples of equations used for subspace processing according to embodiments of the present disclosure. As illustrated in FIG. 10, the first device 110a may perform subspace processing using subspace processing equations 1000. For example, after the first device 110a performs detection filtering to isolate the direct-path peak and converts from the time-domain to the frequency-domain, the resulting signal $X(\omega)$ can be modeled as signal model 1010:

$$X(\omega) = F(\omega) A_\theta(\omega) \quad [3]$$

where $X(\omega)$ is the observed signal generated by detection filtering, $F(\omega)$ denotes incident signal(s) 1015, and $A_\theta(\omega)$ denotes a steering vector 1020. In this example, $X(\omega)$ defines a one-dimensional (1D) subspace that should include the steering vector $A_\theta(\omega)$.

To determine the steering vector $A_\theta(\omega)$ (e.g., estimated azimuth value), the first device 110a may define the orthogonal complement space as the noise subspace that includes signals from all other directions (e.g., all directions other than the steering vector $A_\theta(\omega)$). For example, while not illustrated in the signal model 1010, the observed signal $X(\omega)$ may include additional noise that is random (e.g., not interference or a function of the azimuth value). Thus, the first device 110a may determine the signal subspace associated with the steering vector and the noise subspace as a function of the observed signal, which remains static for all azimuth values.

To determine the estimated azimuth value, the first device 110a may sweep through the parameter space to find the steering vector that minimizes the component in the noise subspace. In this case, the parameter is the azimuth θ, and the steering vectors come from the device dictionary (e.g., device acoustic characteristics data) previously calculated for the first device 110a. As described above, the device acoustic characteristics data represents the acoustic response of the first device 110a to each acoustic plane-wave of interest, completely characterizing the device behavior for each acoustic plane-wave. Each entry of the device acoustic characteristics data has the form $\{z(\omega,\phi,\theta)\}_{\omega,\phi,\theta}$, which represents the acoustic pressure vector (at all microphones) at frequency ω, for an acoustic plane-wave of elevation $\phi_1$ and azimuth $\theta_1$. Thus, sweeping through the parameter space for all potential azimuth values may correspond to determining an inner product between the observed signal and each entry of the device acoustic characteristics data associated with an azimuth value in order to find a single steering vector that minimizes the component in the noise subspace.

When the noise subspace is given by eigenvectors of a covariance matrix, each steering vector may be projected into the noise subspace as the eigendecomposition provides an orthonormal basis directly. However, when a basis is not available, the system 100 may simplify the process with a few assumptions. First, as the signal subspace is one-dimensional (1D), the system 100 may define a normalized basis vector 1030 (e.g., normalized data) as $Z(\omega)=X(\omega)/|X(\omega)|$. For example, the system 100 may determine the normalized basis vector 1050 by normalizing a portion of the audio data (e.g., signal $X(\omega)$) that was isolated during detection filtering described above. The system 100 may also define a signal projection 1040 projecting into the signal subspace as:

$$Z(\omega)\overline{Z(\omega)}A_\theta(\omega) \quad [4]$$

As the signal subspace and the noise subspaces are orthogonal, the sum of the squared magnitudes of the signal components and the noise components is the squared magnitude of the original vector. As the first device 110a sweeps through the steering vectors, the system 100 may normalize each steering vector so that its magnitude does not affect the result. For example, the first device 110a may compute the squared magnitude of the noise component (e.g., noise magnitude 1050) as:

$$A_\theta^{(N)}(\omega) = 1 - A_\theta^{(S)}(\omega) = 1 - Z(\omega)\overline{Z(\omega)}A_\theta(\omega) \quad [5]$$

This leads to subspace equation 1060:

$$P(\omega, \theta) = \frac{1}{1 - Z(\omega)\overline{Z(\omega)}A_\theta(\omega)} \quad [6]$$

Using the subspace equation 1060, the first device 110a may determine an inner product between the observed signal and each entry of the device acoustic characteristics data associated with an azimuth value in order to find a single steering vector that minimizes the component in the noise subspace. For example, the collection of all steering vectors defines the parameterization, which can be illustrated as a curvy line during subspace processing. Thus, the first device 110a may sweep through the azimuth values to identify the azimuth value corresponding to a steering vector that is closest to the signal subspace.

Figure 11A:
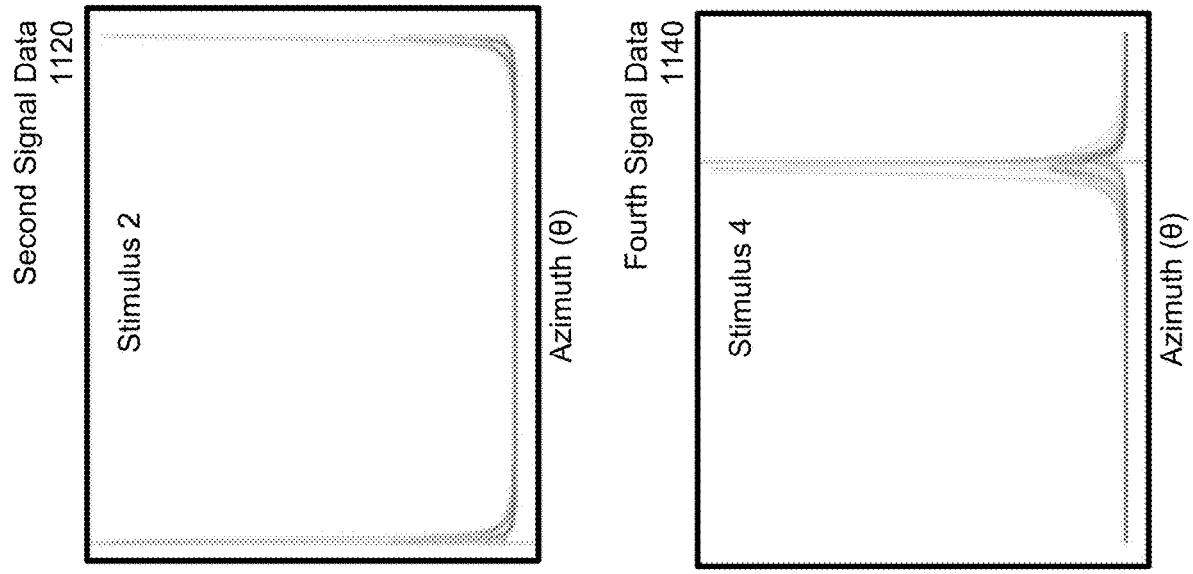
FIGS. 11A-11B illustrate examples of signal data corresponding to subspace processing, dot product processing, and normalized dot product processing according to embodiments of the present disclosure.
Figure 11A:
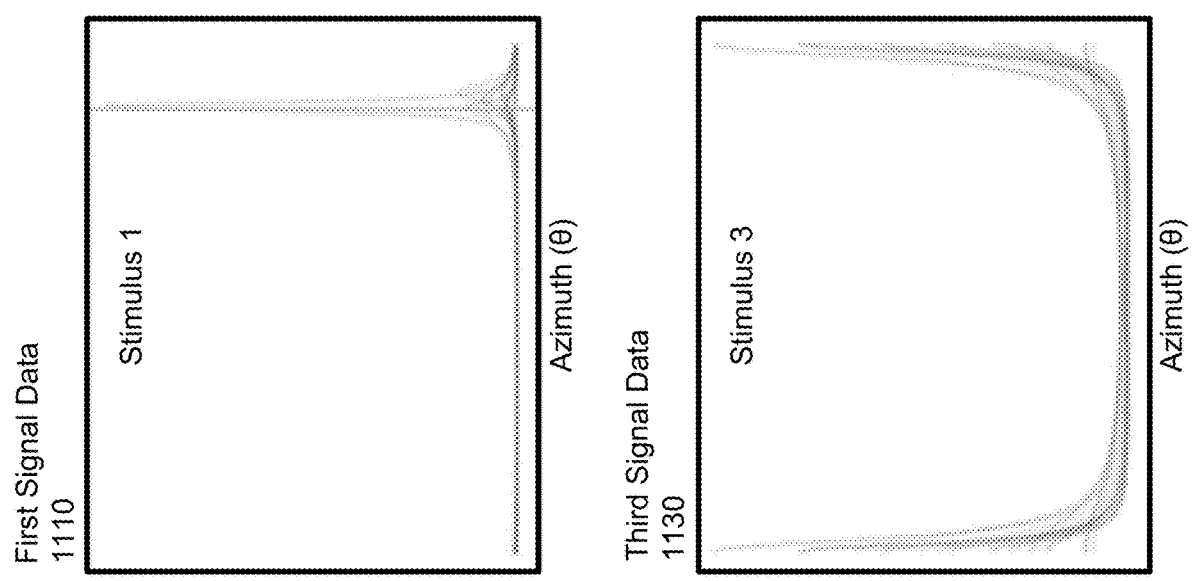
Figure 11B:
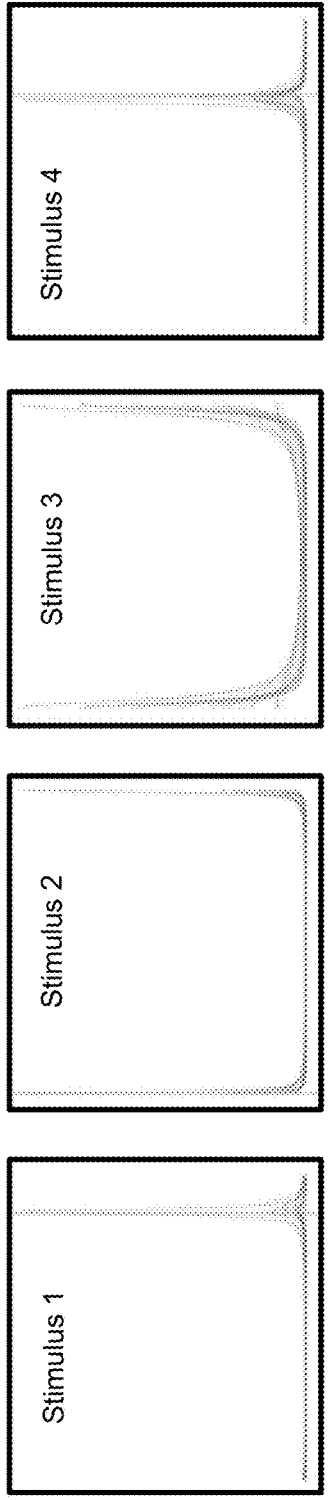
Figure 11B:
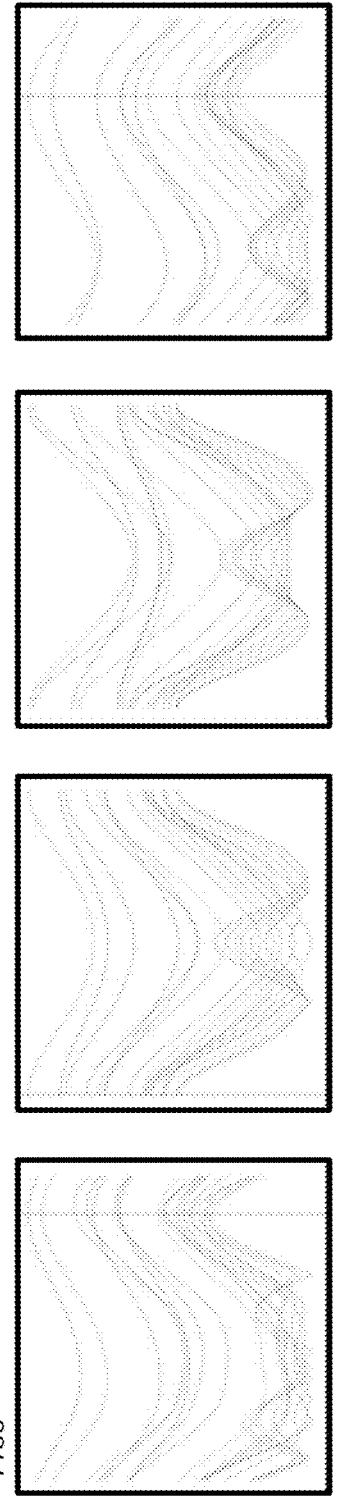
Figure 11B:
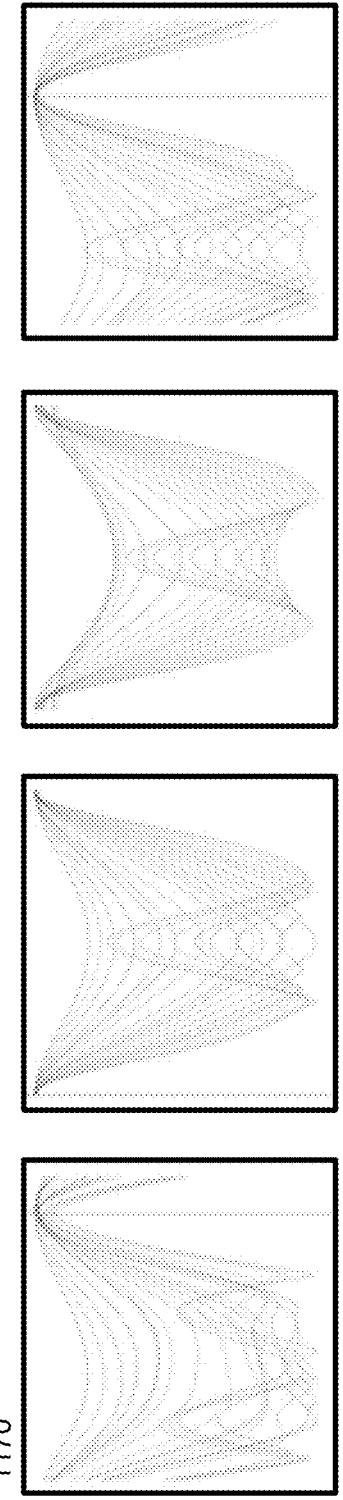
Figure 11B:
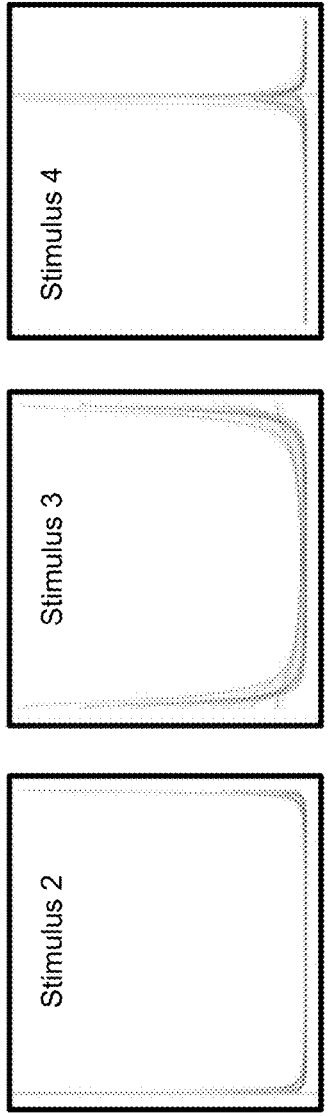
Figure 11B:
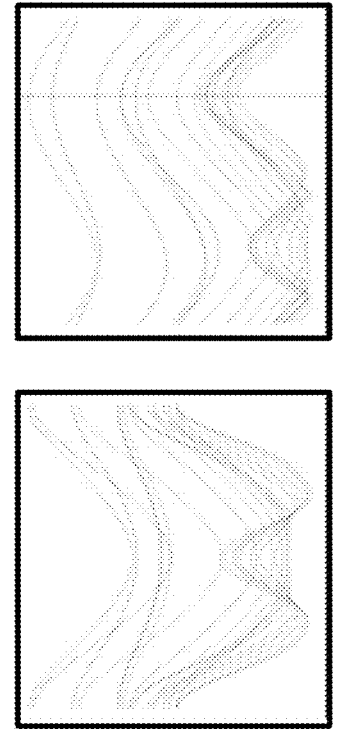
Figure 11B:
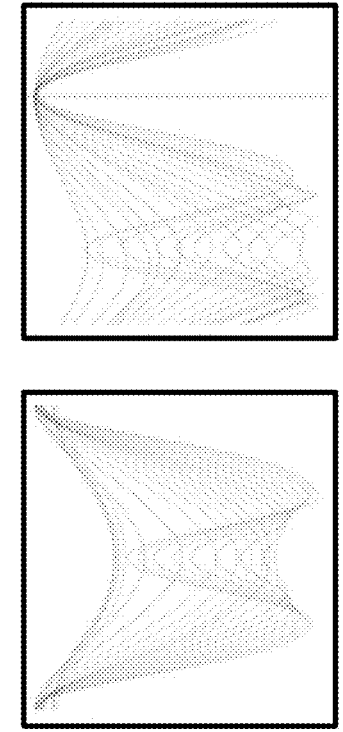

FIGS. 11A-11B illustrate the result of performing a parameter sweep through possible azimuths. For example, the steering vectors are taken from the device acoustic characteristics data, as described above. As illustrated in FIG. 11A, a ground truth angle of arrival is illustrated as a gray line, while the other lines represent the response at different frequencies. Because this is fundamentally a narrowband approach, the first device 110a may perform the analysis independently at each frequency band and combine the results across the frequency bands. For example, the first device 110a may average the results, although the disclosure is not limited thereto.

As illustrated in FIG. 11A, first signal data 1110 indicates that the first stimulus corresponds to a first azimuth value, second signal data 1120 indicates that the second stimulus corresponds to a second azimuth value, third signal data 1130 indicates that the third stimulus corresponds to a third azimuth value, and fourth signal data 1140 indicates that the fourth stimulus corresponds to a fourth azimuth value.

FIG. 11B includes the charts shown in FIG. 11A as an example of subspace processing 1150. However, the disclosure is not limited thereto, and the system 100 may generate similar results by performing dot product processing 1160. Additionally or alternatively, the system 100 may perform normalized dot product processing 1170 without departing from the disclosure.

In the subspace processing described above, the device dictionary enables the system 100 to map one-dimensional azimuth values to the N-dimensional subspace model. For example, the system 100 may use the steering vectors included in the device dictionary (e.g., parameterized dictionary) to do a parameter sweep through the azimuth values, with each azimuth value corresponding to a vector in the N-dimensional subspace. Thus, the device dictionary is used to determine the vector as a function of the azimuth value, which can be used to determine the final azimuth value that is closest to the signal subspace in the subspace model.

While the examples described above refer to the first device 110a using steering vectors and/or vector data included in a device dictionary associated with the first device 110a, the disclosure is not limited thereto. Thus, the first device 110a may determine steering vectors using other techniques without departing from the disclosure, such as using simulations based on a geometry of the device. For example, the first device 110a may use a freefield model (e.g., microphones floating in space) to estimate a plurality of steering vectors that can be used during subspace processing without departing from the disclosure.

Additionally or alternatively, while the examples described above refer to the first device 110a performing a parameter sweep through potential azimuth values, the disclosure is not limited thereto. Instead, the first device 110a may perform a parameter sweep through potential azimuth values, potential elevation values, and/or potential frequency ranges without departing from the disclosure. For example, the first device 110a may compute the inner product for each azimuth while averaging across frequency and elevation, may compute the inner product for each azimuth and elevation while averaging across frequency, may compute the inner product for each azimuth, elevation, and frequency, and/or a combination thereof without departing from the disclosure.

In the example described above, the first device 110a may calculate the inner product for each entry and then average across parameters that are unnecessary, such as frequency and/or elevation. As used herein, averaging across parameters refers to generating a single value using a plurality of different frequencies and/or elevation values, such as by determining a weighted combination and/or the like. For example, the first device 110a may determine inner products associated with a first azimuth value and a plurality of elevation values and may combine these inner products to determine a single value associated with the first azimuth value. In some examples, the first device 110a may use a plurality of entries (e.g., for each of the plurality of elevation values) to determine a plurality of inner products and then combine the plurality of inner products to determine a first value associated with the first azimuth value. However, the disclosure is not limited thereto, and in other examples the first device 110a may combine the plurality of entries to determine a second value (e.g., approximation representing the plurality of elevation values as a whole) and then determine the first value by taking a single inner product using the second value without departing from the disclosure.

Figure 12:
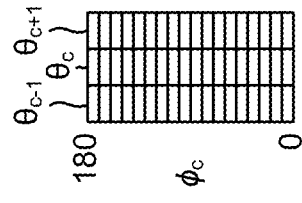
FIG. 12 illustrates examples of grouping steering vectors by elevation according to embodiments of the present disclosure.
Figure 12:
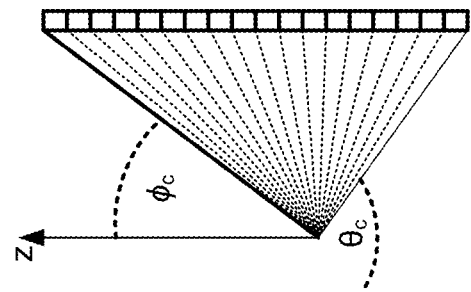
Figure 12:
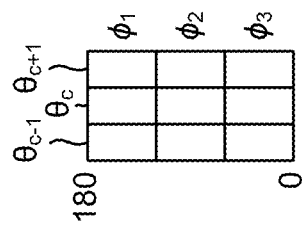
Figure 12:
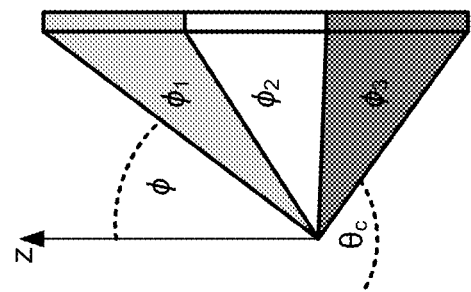
Figure 12:
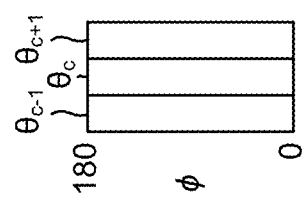
Figure 12:
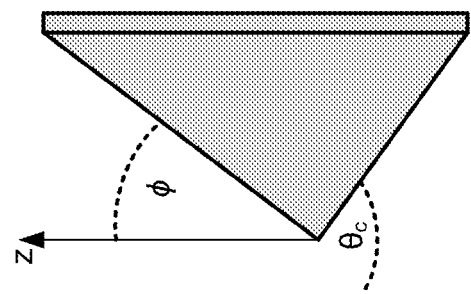

FIG. 12 illustrates examples of grouping steering vectors by elevation according to embodiments of the present disclosure. As illustrated by elevation examples 1200, the system 100 may process steering vectors using different techniques to account for elevation values in different ways. In some examples, the system 100 may determine steering vectors using only azimuth values, which ignores elevation by grouping all elevation values together. In this example, a direction of arrival corresponds to an angle of arrival, without regard to elevation. In other examples, the system 100 may determine steering vectors by dividing elevation values into groups, which may provide increased resolution and/or accuracy without increasing a processing consumption. Alternatively, the system 100 may determine steering vectors using individual elevation values, resulting in a highest resolution but also increased complexity.

For ease of illustration, the elevation examples 1200 are not drawn entirely to scale. For example, while elevation values ranging from 0° to 180° would extend from the −z axis to the +z axis, the elevation examples 1200 depict a cross-sectional view to conceptually illustrate that a single azimuth value can be divided into different groups of elevation values. Thus, the examples shown in FIG. 12 are intended to conceptually illustrate different groupings, but the groupings themselves may not be illustrated properly based on the actual elevation values associated with each group.

As illustrated in FIG. 12, in some examples the system 100 may determine the direction of arrival using elevation agnostic 1210 processing that combines steering vectors associated with all elevation values for a single azimuth value. For example, the system 100 may determine a first number of steering vectors (e.g., 360), with each steering vector corresponding to a single azimuth value (e.g., covering 1° around the device 110) and all elevation values associated with the azimuth value. As shown in elevation examples 1200 illustrated in FIG. 12, a first steering vector corresponds to a single azimuth value (e.g., $\theta_c$) and a plurality of elevation values (e.g., $0 \leq \phi \leq 180$), which groups all elevation values together.

In other examples, the system 100 may determine the direction of arrival using grouped elevation 1220 processing that combines steering vectors associated with a range of elevation values for a single azimuth value. For example, if the system 100 divides the elevation values into three groups (e.g., 60 degrees for each group), the system 100 may determine a second number of steering vectors (e.g., 360×3=1080), with each steering vector corresponding to a single azimuth value (e.g., covering 1° around the device 110) and a group of elevation values associated with the azimuth value.

As shown in the grouped elevation 1220 example illustrated in FIG. 12, a first steering vector may correspond to a first azimuth value (e.g., $\theta_c$) and a first group (e.g., $\phi_1$) comprising a first plurality of elevation values (e.g., $120 \leq \phi_1 \leq 180$), a second steering vector may correspond to the first azimuth value (e.g., $\theta_c$) and a second group (e.g., $\phi_2$) comprising a second plurality of elevation values (e.g., $60 \leq \phi_1 \leq 120$), and a third steering vector may correspond to the first azimuth value (e.g., $\theta_c$) and a third group (e.g., $\phi_3$) comprising a third plurality of elevation values (e.g., $0 \leq \phi_1 \leq 60$), although the disclosure is not limited thereto. Thus, for each azimuth value (e.g., $\theta_c$), the system 100 may determine three steering vectors, although the disclosure is not limited thereto and the number of groups may vary without departing from the disclosure.

Additionally or alternatively, while FIG. 12 illustrates an example in which the groups are uniformly distributed (e.g., each group corresponds to) 60°, the disclosure is not limited thereto and the system 100 may use non-uniform groupings without departing from the disclosure. For example, in some examples the system 100 may distinguish extreme elevation values from a larger range of moderate elevation values without departing from the disclosure. For example, the system 100 may divide the elevation values into a first plurality of elevation values (e.g., $150 \leq \phi_1 \leq 180$), a second plurality of elevation values (e.g., $30 \leq \phi_2 \leq 150$), and a third plurality of elevation values (e.g., $0 \leq \theta_3 \leq 30$) without departing from the disclosure, although the disclosure is not limited thereto.

In some examples, the system 100 may determine the direction of arrival using individual elevation 1230 processing that uses individual steering vectors for a single azimuth value and a single elevation value. For example, the system 100 may determine a third number of steering vectors (e.g., 360×180=64,800), with each steering vector corresponding to a single azimuth value (e.g., covering 1° along a horizontal plane) and a single elevation value (e.g., covering 1° along a vertical plane). As shown in the individual elevation 1230 example illustrated in FIG. 12, a first steering vector may correspond to a first azimuth value (e.g., $\theta_c$) and a first elevation value (e.g., $\phi_c$).

While the elevation examples 1200 illustrate elevation values being within a first range (e.g., $0 \leq \phi \leq 180$), the disclosure is not limited thereto and the system 100 may use a second range (e.g., $-90 \leq \phi \leq +90$) without departing from the disclosure. Additionally or alternatively, while the elevation examples 1200 illustrate each steering vector corresponding to a single azimuth value (e.g., 1° along a horizontal plane around the device 110), the disclosure is not limited thereto and the steering vectors may have a higher or lower resolution without departing from the disclosure. For example, the system 100 may use group azimuth values together (e.g., each steering vector may correspond to 2° or more) and/or use greater precision (e.g., each steering vector may correspond to 0.5° or less) without departing from the disclosure.

As described above, the system 100 may determine a direction of arrival using a combination of temporal filtering and subspace processing. For example, the system 100 may perform temporal filtering to isolate a direct-path peak associated with a calibration tone and select a portion of audio data that represents the direct-path peak. Using the portion of the audio data, the system 100 may perform subspace processing to identify a steering vector that corresponds to the direct-path peak. For example, the system 100 may perform a parameter sweep to sweep through the parameter space to find a steering vector that minimizes the components in the noise subspace. Alternatively, the system 100 may perform the parameter sweep to find a steering vector that maximizes the components in the signal subspace without departing from the disclosure.

In some examples, the system 100 may approximate the steering vectors using device acoustic characteristics data (e.g., device dictionary). For example, each entry (e.g., dictionary vector) of the device dictionary has the form $\{z(\omega,\phi,\theta)\}_{\omega,\phi,\theta}$, which represents the acoustic pressure vector (at all microphones) at frequency $\omega$, for an acoustic plane-wave of elevation $\phi_1$ and azimuth $\theta_1$. Thus, a length of each entry of the device dictionary corresponds to a number of microphones 112 included in the microphone array, such that a device 110 having n microphones is associated with a dictionary vector having length N (e.g., N-dimensional vector). To perform subspace processing using the device dictionary, the system 100 may determine a dictionary vector corresponding to each direction of arrival and use these N-dimensional dictionary vectors to map an individual direction of arrival to the N-dimensional subspace used during subspace processing. However, the disclosure is not limited thereto and the system 100 may approximate the steering vectors using other techniques without departing from the disclosure. For example, the system 100 may assume a free-field model (e.g., microphones 112 floating in space) and simulate steering vectors based on a geometry of the device 110 using the free-field model, although the disclosure is not limited thereto.

As mentioned above, the system 100 may determine a dictionary vector corresponding to each direction of arrival and may use these N-dimensional dictionary vectors to map an individual direction of arrival to the N-dimensional subspace used during subspace processing. If the system 100 determines the angle of arrival (e.g., elevation values are ignored or combined for an individual azimuth), the parameter is the azimuth value $\theta$ and the system 100 approximates the steering vectors using the device dictionary (e.g., device acoustic characteristics data), with an individual dictionary vector associated with an azimuth value $\theta$ being used as the steering vector $A_\theta(\omega)$. For example, In the example described above, the system 100 may calculate the inner product for each entry and then average across parameters that are unnecessary, such as frequency and/or elevation. As used herein, averaging across parameters refers to generating a single value using a plurality of different frequencies and/or elevation values, such as by determining a weighted combination and/or the like. For example, the system 100 may determine inner products associated with a first azimuth value and a plurality of elevation values and may combine these inner products to determine a single value associated with the first azimuth value. In some examples, the system 100 may use a plurality of entries (e.g., for each of the plurality of elevation values) to determine a plurality of inner products and then combine the plurality of inner products to determine a first value associated with the first azimuth value. However, the disclosure is not limited thereto, and in other examples the system 100 may combine the plurality of entries to determine a second value (e.g., approximation representing the plurality of elevation values as a whole) and then determine the first value by taking a single inner product using the second value without departing from the disclosure.

Figure 13:
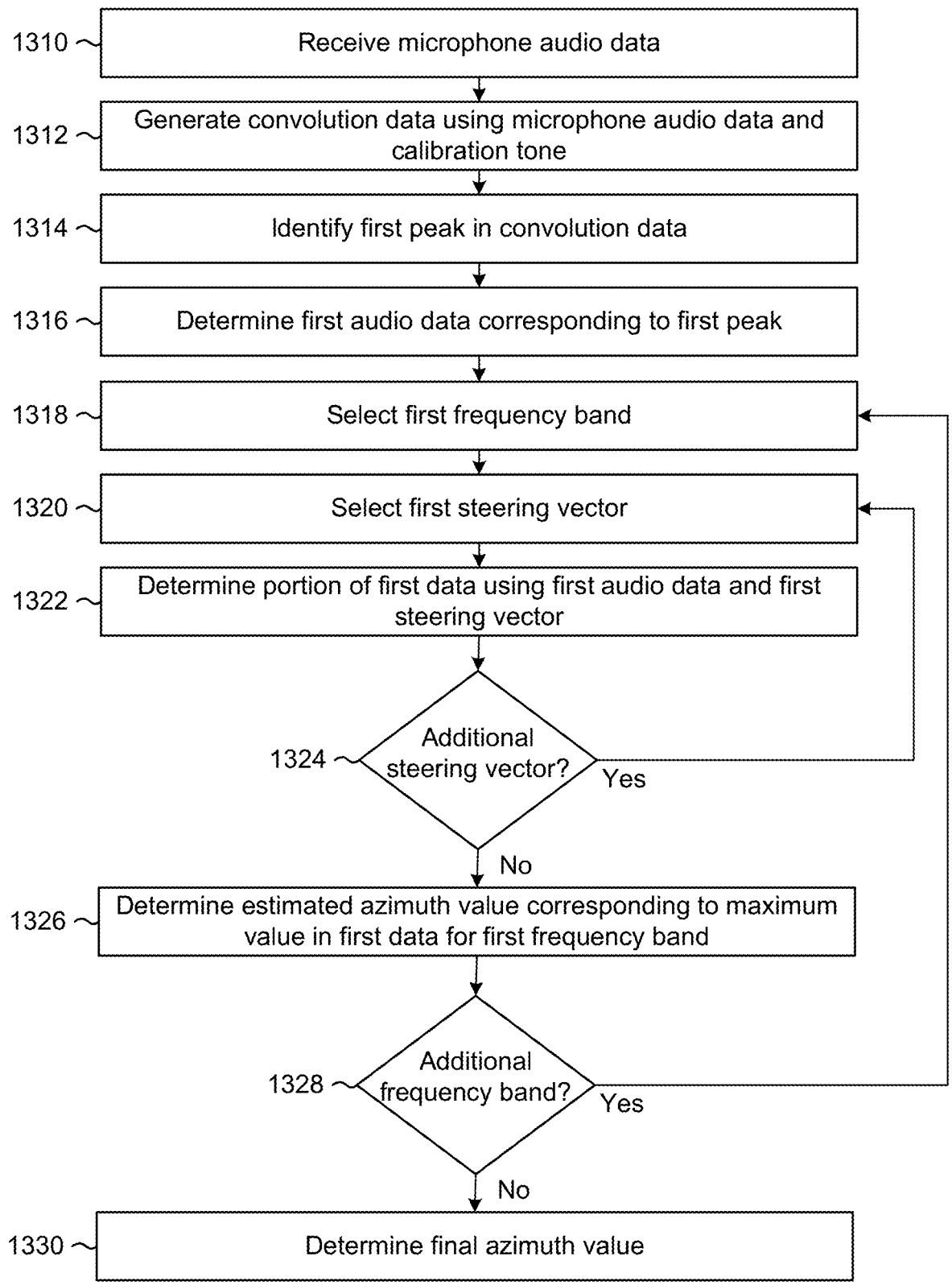
FIG. 13 is a flowchart conceptually illustrating an example method for estimating an angle of arrival according to embodiments of the present disclosure.

FIG. 13 is a flowchart conceptually illustrating an example method for estimating an angle of arrival according to embodiments of the present disclosure. As described above, the system 100 may determine a direction of arrival using a combination of temporal filtering and subspace processing. For example, the system 100 may perform temporal filtering to isolate a direct-path peak associated with a calibration tone and select a portion of audio data that represents the direct-path peak. Using the portion of the audio data, the system 100 may perform subspace processing to identify a steering vector that corresponds to the direct-path peak. For example, the system 100 may perform a parameter sweep to sweep through the parameter space to find a steering vector that minimizes the components in the noise subspace. Alternatively, the system 100 may perform the parameter sweep to find a steering vector that maximizes the components in the signal subspace without departing from the disclosure.

As illustrated in FIG. 13, the system 100 may receive (1310) microphone audio data and may generate (1312) convolution data using the microphone audio data and a calibration tone. For example, the system 100 may perform convolution processing to convolve the microphone audio data with calibration data representing the calibration tone (e.g., including a representation of the calibration tone). In some examples, the system 100 may perform a cross-correlation between the microphone audio data and the calibration data, although the disclosure is not limited thereto. After generating the convolution data, the system 100 may identify (1314) a first peak in the convolution data and may determine (1316) first audio data corresponding to the first peak, as described in greater detail above with regard to FIGS. 6-7. For example, the system 100 may identify the first peak corresponding to a direct-path peak and may select a portion of the microphone audio data representing the first peak.

The system 100 may select (1318) a first frequency band, select (1320) a first steering vector, and determine (1322) a portion of first data using the first audio data and the first steering vector. For example, the system 100 may determine an inner product between the first steering vector and the first audio data. In some examples, the steering vector may correspond to a single azimuth value. However, the disclosure is not limited thereto, and in other examples the steering vector may correspond to an azimuth value and an elevation value without departing from the disclosure. The system 100 may determine (1324) whether there is an additional steering vector, and, if there is, may loop to step 1320 and repeat steps 1320-1322 for the additional steering vector. Thus, the system 100 may sweep through the parameter space using all of the potential steering vectors to generate the first data.

If there are no additional steering vectors, the system 100 may determine (1326) an estimated azimuth value corresponding to a maximum value in the first data for the first frequency band. For example, the system 100 may determine which steering vector (e.g., azimuth value, or azimuth value and elevation value) is associated with the maximum value in the first data and may select that as the estimated azimuth value. The system 100 may then determine (1328) whether there is an additional frequency band of interest and, if so, may loop to step 1318 and repeat steps 1318-1826 for the additional frequency band. Once the system 100 has determined the estimated azimuth value for all of the frequency bands of interest, the system 100 may determine (1330) a final azimuth value using the estimated azimuth values. For example, the system 100 may determine an average of the estimated azimuth values, a weighted sum, and/or the like without departing from the disclosure.

While FIG. 13 illustrates an example in which the system 100 performs a parameter sweep through potential azimuth values, the disclosure is not limited thereto. Instead, the system 100 may perform a parameter sweep through potential azimuth values, potential elevation values, and/or potential frequency ranges without departing from the disclosure. For example, the system 100 may compute the inner product for each azimuth while averaging across frequency and elevation, may compute the inner product for each azimuth and elevation while averaging across frequency, may compute the inner product for each azimuth, elevation, and frequency, and/or a combination thereof without departing from the disclosure.

In the example described above, the system 100 may calculate the inner product for each entry and then average across parameters that are unnecessary, such as frequency and/or elevation. As used herein, averaging across parameters refers to generating a single value using a plurality of different frequencies and/or elevation values, such as by determining a weighted combination and/or the like. For example, the system 100 may determine inner products associated with a first azimuth value and a plurality of elevation values and may combine these inner products to determine a single value associated with the first azimuth value. In some examples, the system 100 may use a plurality of entries (e.g., for each of the plurality of elevation values) to determine a plurality of inner products and then combine the plurality of inner products to determine a first value associated with the first azimuth value. However, the disclosure is not limited thereto, and in other examples the system 100 may combine the plurality of entries to determine a second value (e.g., approximation representing the plurality of elevation values as a whole) and then determine the first value by taking a single inner product using the second value without departing from the disclosure.

Figure 14:
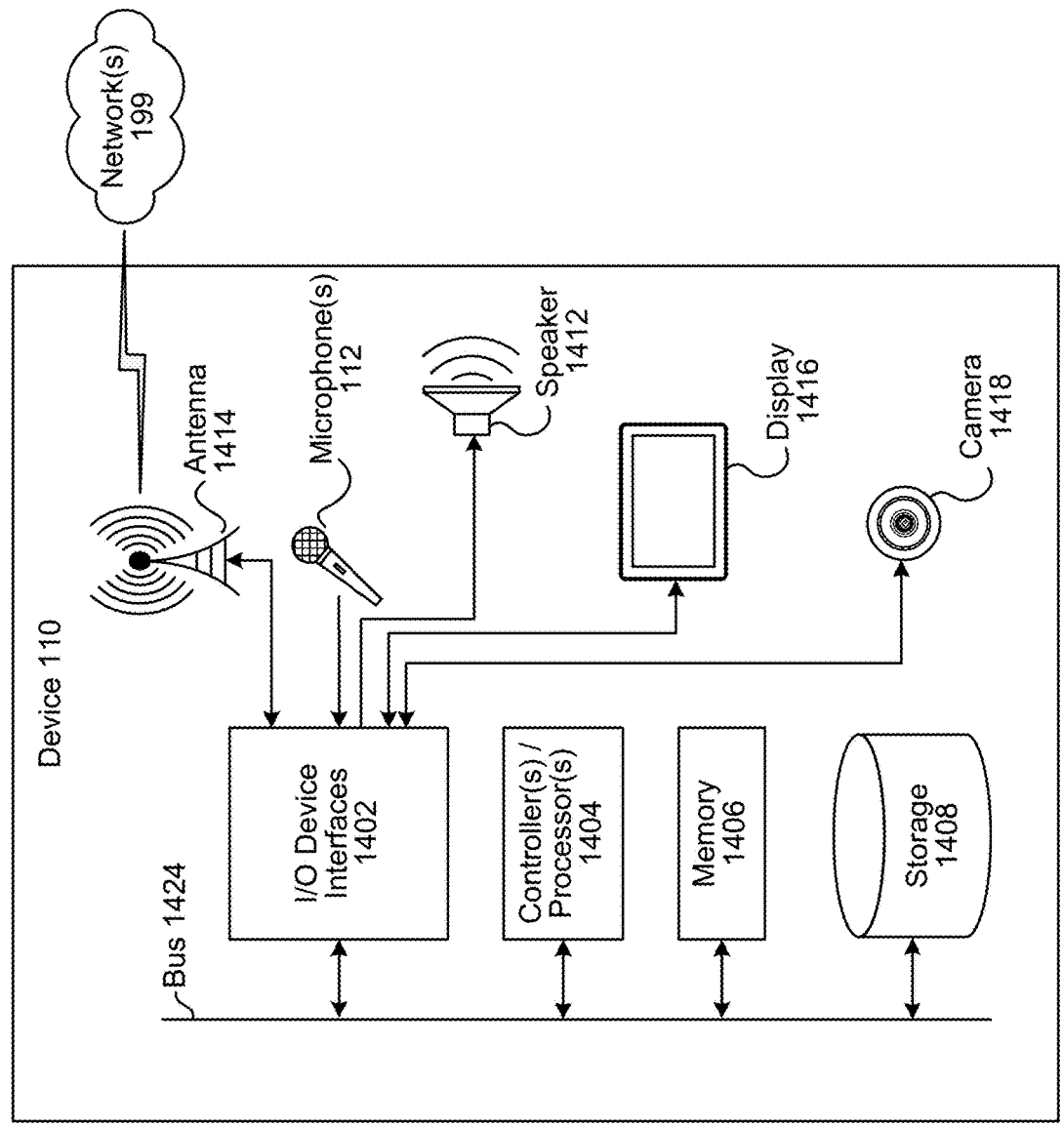
FIG. 14 is a block diagram conceptually illustrating example components of a device, according to embodiments of the present disclosure.
Figure 15:
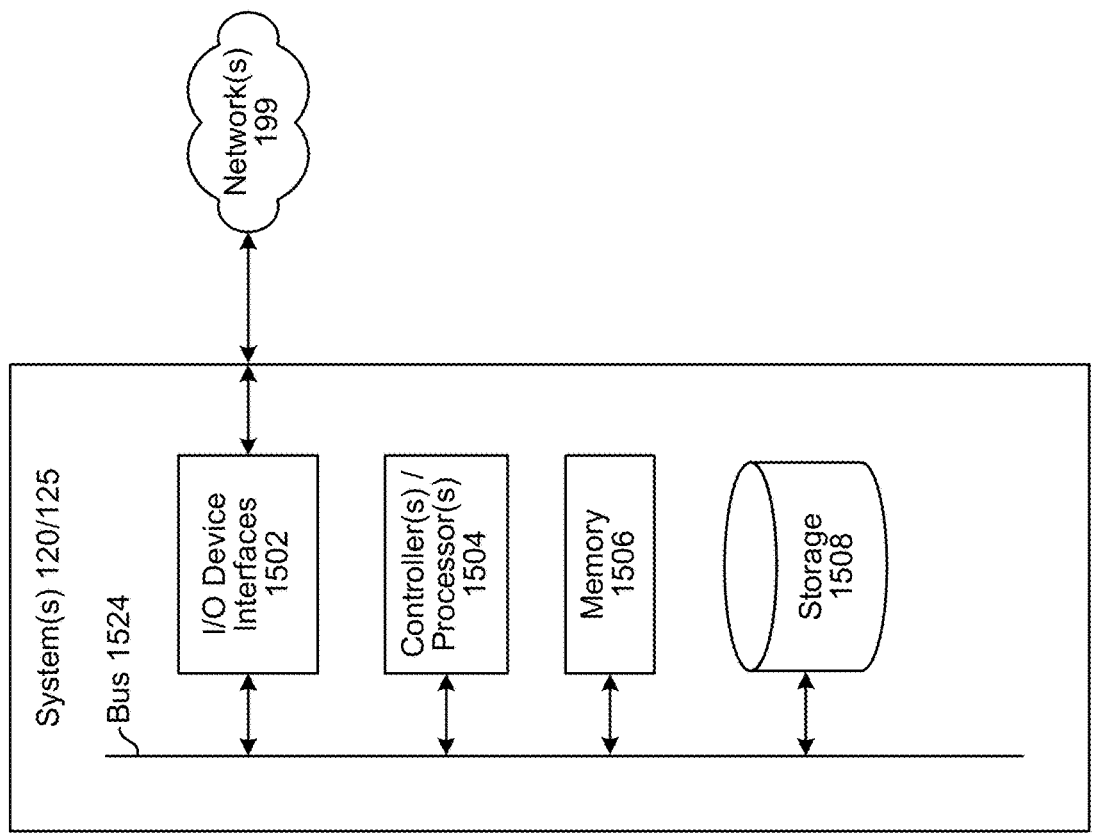
FIG. 15 is a block diagram conceptually illustrating example components of a system, according to embodiments of the present disclosure.

FIG. 14 is a block diagram conceptually illustrating a device 110 that may be used with the system. FIG. 15 is a block diagram conceptually illustrating example components of supporting device(s) 120, such as a natural language command processing device, which may assist with ASR processing, NLU processing, etc. The supporting device(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/supporting device(s) 120 may be located remotely from the device 110 as its operations may not require proximity to the user. The server/supporting device(s) 120 may be located in an entirely different location from the device 110 (for example, as part of a cloud computing system or the like) or may be located in a the same environment as the device 110 but physically separated therefrom (for example a home server or similar device that resides in a user's home or business but perhaps in a closet, basement, attic, or the like). One benefit to the server/supporting device(s) 120 being in a user's home/business is that data used to process a command/return a response may be kept within the user's home, thus reducing potential privacy concerns.

Multiple supporting device(s) 120 may be included in the overall system 100 of the present disclosure, such as one or more natural language processing devices for performing ASR processing, one or more natural language processing devices for performing NLU processing, etc. In operation, each of these supporting devices 120 may include computer-readable and computer-executable instructions that reside on the respective supporting device(s) 120, as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 14, the device 110 may include input/output device interfaces 1402 that connect to a variety of components such as an audio output component such as one or more loudspeaker(s) 1412, a wired headset or a wireless headset (not illustrated), or other component capable of outputting audio. The device 110 may also include an audio capture component. The audio capture component may be, for example, one or more microphone(s) 112 or array of microphones, a wired headset or a wireless headset (not illustrated), etc. If an array of microphones 112 is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110 and/or the supporting device(s) 120 may include their own dedicated processors, memory, and/or storage. Alternatively, one or more of the components of the device(s) 110 and/or the supporting device(s) 120 may utilize the I/O interfaces (1402/1502), processor(s) (1404/1504), memory (1406/1506), and/or storage (1408/1508) of the device(s) 110 and/or the supporting device(s) 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, and the supporting device(s) 120, as described herein, are illustrative, and may be located as a stand-alone device or may be included, in whole or in part, as a component of a larger device or system. As can be appreciated, a number of components may exist either on the supporting device(s) 120 and/or on the device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 16:
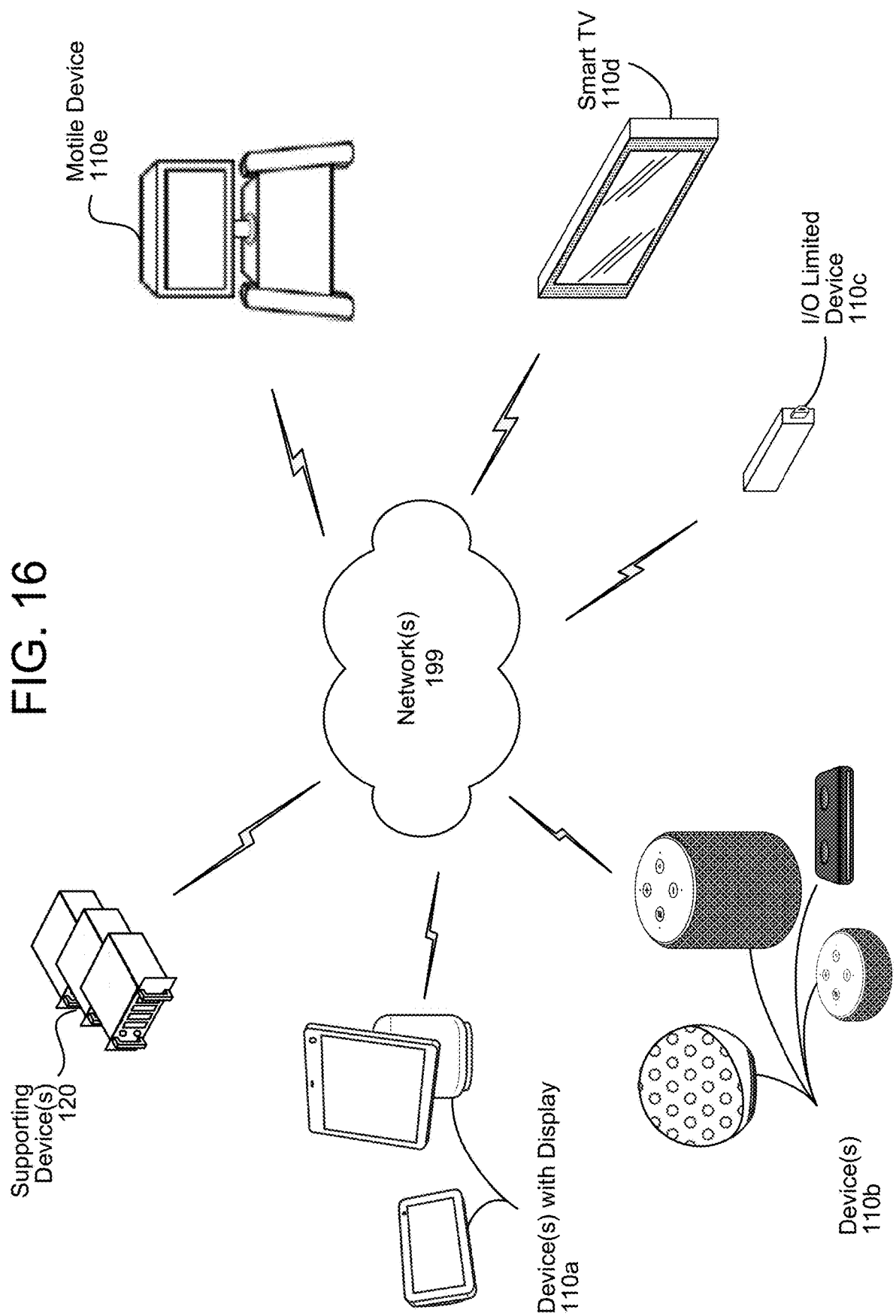
FIG. 16 illustrates an example of device(s) included in the overall system, according to embodiments of the present disclosure.

As illustrated in FIG. 16, multiple devices (110a-110e, 120) may contain components of the system and the devices may be connected over a network(s) 199. The network(s) 199 may include a local or private network or may include a wide network such as the Internet. Devices may be connected to the network(s) 199 through either wired or wireless connections. For example, device(s) with display 110a, device(s) 110b, an input/output limited device 110c, a display/smart television 110d, and/or a motile device 110e may be connected to the network(s) 199 through a wireless service provider, over a Wi-Fi or cellular network connection, or the like. Other devices are included as network-connected support devices, such as the natural language command processing system, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    determining, by a first device, first audio data including a representation of an audible sound generated by a second device;
    determining, using calibration data, a portion of the first audio data that includes a first peak associated with the audible sound, the first peak representing a highest amplitude value of sound traveling along a direct path between the second device and the first device;
    determining, using first data corresponding to a first microphone and a second microphone of the first device, first vector data representing an acoustic response of the first device for a first direction;
    determining, using the first data, second vector data representing an acoustic response of the first device for a second direction;
    determining a first value using the portion of the first audio data and the first vector data;
    determining a second value using the portion of the first audio data and the second vector data; and
    processing the first value with respect to the second value to determine that the second device corresponds to the first direction.

2. The computer-implemented method of claim 1, wherein the calibration data includes a representation of a calibration tone and wherein determining the portion of the first audio data further comprises:
    determining, using a detection filter and the calibration data, the portion of the first audio data, the detection filter configured to detect an earliest representation of the calibration tone included in the first audio data.

3. The computer-implemented method of claim 1, wherein determining the portion of the first audio data further comprises:
    generating convolution data using the first audio data and the calibration data;
    detecting a first number of peaks represented in the convolution data, the first number of peaks corresponding to magnitude values that exceed a threshold value;
    determining a portion of the convolution data that includes a first peak of the first number of peaks; and
    determining the portion of the first audio data using the portion of the convolution data.

4. The computer-implemented method of claim 1, wherein the first vector data and the second vector data are associated with a first elevation value representing an angle relative to the first device along a vertical plane, the method further comprising:
    determining, using the first data, third vector data corresponding to the first direction, the third vector data associated with a second elevation value that is different than the first elevation value;

determining, using the first data, fourth vector data corresponding to the second direction, the fourth vector data associated with the second elevation value;
determining a third value using the portion of the first audio data and the third vector data;
determining a fourth value using the portion of the first audio data and the fourth vector data; and
determining, using the first value, the second value, the third value, and the fourth value, that the second device corresponds to the first direction.

5. The computer-implemented method of claim 1, wherein the first vector data and the second vector data are associated with a first frequency range, the method further comprising:
determining, using the first data, third vector data corresponding to the first direction, the third vector data associated with a second frequency range that is different than the first frequency range;
determining, using the first data, fourth vector data corresponding to the second direction, the fourth vector data associated with the second frequency range;
determining a third value using the portion of the first audio data and the third vector data;
determining a fourth value using the portion of the first audio data and the fourth vector data; and
determining, using the first value, the second value, the third value, and the fourth value, that the second device corresponds to the first direction.

6. The computer-implemented method of claim 1, wherein determining the first value further comprises:
determining second data by normalizing the portion of the first audio data; and
determining the first value by calculating an inner product between the second data and the first vector data.

7. The computer-implemented method of claim 1, wherein determining the first vector data further comprises:
determining third vector data corresponding to a first azimuth value and a first elevation value;
determining fourth vector data corresponding to the first azimuth value and a second elevation value; and
determining the first vector data using the third vector data and the fourth vector data.

8. The computer-implemented method of claim 1, wherein:
the first direction corresponds to a first azimuth value and a first elevation value, the first azimuth value representing a first angle relative to the first device along a horizontal plane and the first elevation value representing a second angle relative to the first device along a vertical plane,
the second direction corresponds to the first azimuth value and a second elevation value that represents a third angle relative to the first device along the vertical plane,
the first vector data represents the acoustic response of the first device for a first input associated with the first azimuth value and the first elevation value, and
the second vector data represents the acoustic response of the first device for a second input associated with the first azimuth value and the second elevation value.

9. The computer-implemented method of claim 1, wherein the first data includes at least one vector representing a plurality of values, a first number of the plurality of values corresponding to a second number of microphones in a microphone array of the first device, a first value of the plurality of values corresponding to a first microphone and representing an acoustic pressure at the first microphone in response to an acoustic wave.

10. The computer-implemented method of claim 1, wherein determining the first vector data further comprises:
determining third vector data corresponding to a first azimuth value, a first elevation value, and a first frequency range;
determining fourth vector data corresponding to the first azimuth value, a second elevation value, and the first frequency range;
determining fifth vector data corresponding to the first azimuth value, the first elevation value, and a second frequency range;
determining sixth vector data corresponding to the first azimuth value, the second elevation value, and the second frequency range; and
determining the first vector data using the third vector data, the fourth vector data, the fifth vector data, and the sixth vector data.

11. A system comprising:
at least one processor; and
memory including instructions operable to be executed by the at least one processor to cause the system to:
determine, by a first device, first audio data including a representation of an audible sound generated by a second device;
determine, using calibration data, a portion of the first audio data that includes a first peak associated with the audible sound, the first peak representing a highest amplitude value of sound traveling along a direct path between the second device and the first device;
determine, using first data corresponding to a first microphone and a second microphone of the first device, first vector data representing an acoustic response of the first device for a first direction;
determine, using the first data, second vector data representing an acoustic response of the first device for a second direction;
determine a first value using the portion of the first audio data and the first vector data;
determine a second value using the portion of the first audio data and the second vector data; and
process the first value with respect to the second value to determine that the second device corresponds to the first direction.

12. The system of claim 11, wherein the memory further comprises instructions that, when executed by the at least one processor, further cause the system to:
determine, using a detection filter and the calibration data, the portion of the first audio data, the calibration data including a representation of a calibration tone, the detection filter configured to detect an earliest representation of the calibration tone included in the first audio data.

13. The system of claim 11, wherein the memory further comprises instructions that, when executed by the at least one processor, further cause the system to:
generate convolution data using the first audio data and the calibration data;
detect a first number of peaks represented in the convolution data, the first number of peaks corresponding to magnitude values that exceed a threshold value;
determine a portion of the convolution data that includes a first peak of the first number of peaks; and
determine the portion of the first audio data using the portion of the convolution data.

14. The system of claim 11, wherein the first vector data and the second vector data are associated with a first elevation value representing an angle relative to the first device along a vertical plane, and the memory further comprises instructions that, when executed by the at least one processor, further cause the system to:

determine, using the first data, third vector data corresponding to the first direction, the third vector data associated with a second elevation value that is different than the first elevation value;

determine, using the first data, fourth vector data corresponding to the second direction, the fourth vector data associated with the second elevation value;

determine a third value using the portion of the first audio data and the third vector data;

determine a fourth value using the portion of the first audio data and the fourth vector data; and determine, using the first value, the second value, the third value, and the fourth value, that the second device corresponds to the first direction.

15. The system of claim 11, wherein the first vector data and the second vector data are associated with a first frequency range, and the memory further comprises instructions that, when executed by the at least one processor, further cause the system to:

determine, using the first data, third vector data corresponding to the first direction, the third vector data associated with a second frequency range that is different than the first frequency range;

determine, using the first data, fourth vector data corresponding to the second direction, the fourth vector data associated with the second frequency range;

determine a third value using the portion of the first audio data and the third vector data;

determine a fourth value using the portion of the first audio data and the fourth vector data; and determine, using the first value, the second value, the third value, and the fourth value, that the second device corresponds to the first direction.

16. The system of claim 11, wherein the memory further comprises instructions that, when executed by the at least one processor, further cause the system to:

determine second data by normalizing the portion of the first audio data; and determine the first value by calculating an inner product between the second data and the first vector data.

17. The system of claim 11, wherein the memory further comprises instructions that, when executed by the at least one processor, further cause the system to:

determine third vector data corresponding to a first azimuth value and a first elevation value;

determine fourth vector data corresponding to the first azimuth value and a second elevation value; and determine the first vector data using the third vector data and the fourth vector data.

18. The system of claim 11, wherein:

the first direction corresponds to a first azimuth value and a first elevation value, the first azimuth value representing a first angle relative to the first device along a horizontal plane and the first elevation value representing a second angle relative to the first device along a vertical plane, the second direction corresponds to the first azimuth value and a second elevation value that represents a third angle relative to the first device along the vertical plane, the first vector data represents the acoustic response of the first device for a first input associated with the first azimuth value and the first elevation value, and the second vector data represents the acoustic response of the first device for a second input associated with the first azimuth value and the second elevation value.

19. The system of claim 11, wherein the first data includes at least one vector representing a plurality of values, a first number of the plurality of values corresponding to a second number of microphones in a microphone array of the first device, a first value of the plurality of values corresponding to a first microphone and representing an acoustic pressure at the first microphone in response to an acoustic wave.

20. The system of claim 11, wherein the memory further comprises instructions that, when executed by the at least one processor, further cause the system to:

determine third vector data corresponding to a first azimuth value, a first elevation value, and a first frequency range;

determine fourth vector data corresponding to the first azimuth value, a second elevation value, and the first frequency range;

determine fifth vector data corresponding to the first azimuth value, the first elevation value, and a second frequency range;

determine sixth vector data corresponding to the first azimuth value, the second elevation value, and the second frequency range; and determine the first vector data using the third vector data, the fourth vector data, the fifth vector data, and the sixth vector data.

\* \* \* \* \*